United States Patent
Wang et al.

(10) Patent No.: US 11,722,991 B2
(45) Date of Patent: Aug. 8, 2023

(54) DYNAMIC CONFIGURATION OF PHYSICAL SIDELINK FEEDBACK CHANNEL FORMAT

(71) Applicant: QUALCOMM Incorporated, San Diego, CA (US)

(72) Inventors: Xiaojie Wang, Hillsborough, NJ (US); Jing Sun, San Diego, CA (US); Piyush Gupta, Bridgewater, NJ (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 17/147,036

(22) Filed: Jan. 12, 2021

(65) Prior Publication Data
US 2022/0225278 A1    Jul. 14, 2022

(51) Int. Cl.
*H04W 72/02* (2009.01)
*H04L 1/1607* (2023.01)
(Continued)

(52) U.S. Cl.
CPC .......... *H04W 72/02* (2013.01); *H04L 1/1671* (2013.01); *H04L 5/0055* (2013.01); *H04W 72/0446* (2013.01); *H04W 72/1268* (2013.01)

(58) Field of Classification Search
CPC ... H04L 1/1671; H04L 5/0055; H04L 1/1861; H04W 72/02; H04W 72/0446; H04W 72/1268

See application file for complete search history.

(56) References Cited

U.S. PATENT DOCUMENTS

2018/0279258 A1* 9/2018 Yasukawa ............. H04L 5/0094
2020/0296796 A1* 9/2020 Uchiyama ............. H04W 28/26
(Continued)

OTHER PUBLICATIONS

Huawei, et al., "Design and Contents of PSCCH and PSFCH", 3GPP Draft, R1-1906596, 3GPP TSG RAN WG1 Meeting #97, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728047, 12 Pages, Retrieved from the Internet: URL:http://www.3gpp.org/ftp/Meetings%5F3GPP%5FSYNC/RAN1/Docs/R1%2D1906596%2Ezip [retrieved on May 13, 2019], sections 2, 3.
(Continued)

*Primary Examiner* — Lan-Huong Truong
(74) *Attorney, Agent, or Firm* — Holland & Hart LLP

(57) ABSTRACT

Methods, systems, and devices for wireless communications are described. A first user equipment (UE) may determine that the first UE is to receive a sidelink transmission from a second UE, the sidelink transmission comprising a sidelink control channel and a sidelink data channel. The first UE may receive, based at least in part on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold. The first UE may receive the sidelink transmission from the second UE. The first UE may transmit, to the second UE, the feedback message using the second resource configuration.

30 Claims, 15 Drawing Sheets

(51) Int. Cl.
  *H04L 5/00*   (2006.01)
  *H04W 72/0446*   (2023.01)
  *H04W 72/1268*   (2023.01)

(56) References Cited

U.S. PATENT DOCUMENTS

2021/0321380 A1* 10/2021 Zhao .................. H04L 5/0042
2022/0109527 A1* 4/2022 Hwang ................ H04L 5/0055
2022/0256504 A1* 8/2022 Lin ..................... H04L 1/1861

OTHER PUBLICATIONS

Intel Corporation: "Sidelink Physical Structure for NR V2X Communication", 3GPP Draft, 3GPP TSG RAN WG1 Meeting #98bis, R1-1910648, 3rd Generation Partnership Project (3GPP), Mobile Competence Centre; 650, Route Des Lucioles, F-06921, Sophia-Antipolis Cedex, France, vol. RAN WG1, No. Chongqing, China, Oct. 14, 2019-Oct. 20, 2019, Oct. 8, 2019 (Oct. 8, 2019), XP051809168, 15 pages, Retrieved from the Internet: URL: https://ftp.3gpp.org/tsg_ran/WG1_RL1/TSGR1_98b/Docs/R1-1910648.zip R1-1910648.docx [retrieved on Oct. 8, 2019] section 4.3, sections 3, 5.
International Search Report and Written Opinion—PCT/US2021/062232—ISA/EPO—dated Mar. 7, 2022.
NTT Docomo, Inc: "Sidelink Physical Layer Structure for NR V2X", 3GPP Draft, 3GPP TSG RAN WG1 #96, R1-1902798_SL Phy Structure_Fin, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600493, 8 Pages, Retrieved from the Internet: URL:http://www.3gpp.org/ftp/tsg%5Fran/WG1%5FRL1/TSGR1%5F96/Docs/R1%2D1902798%2Ezip [retrieved on Feb. 16, 2019] section 2.

* cited by examiner

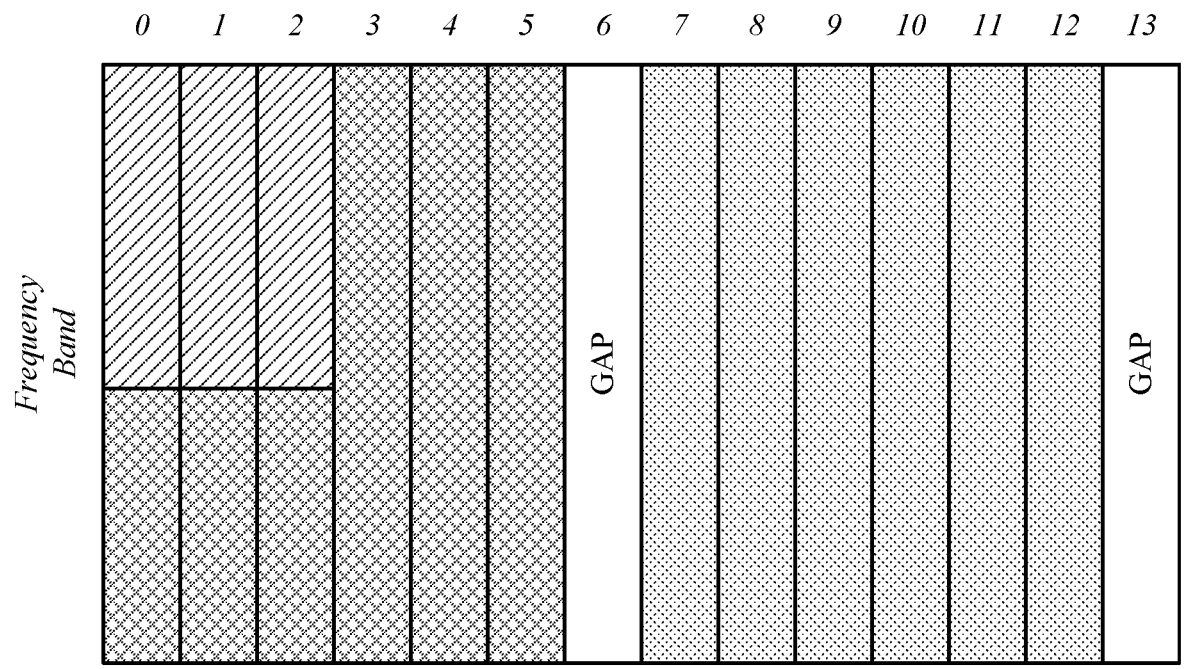
 PSCCH 305
 PSSCH 310
 PSFCH 315
FIG. 3  — 300

DYNAMIC CONFIGURATION OF PHYSICAL SIDELINK FEEDBACK CHANNEL FORMAT

FIELD OF TECHNOLOGY

The following relates to wireless communications, including dynamic configuration of physical sidelink feedback channel format.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support dynamic configuration of physical sidelink feedback channel (PSFCH) format. Broadly, the techniques described herein provide for a dynamic PSFCH configuration. For example, two user equipment (UE)s may determine that the conventional PSFCH resource allocation is insufficient to support hybrid automatic repeat/request (HARQ) feedback reporting. Accordingly, the UEs may identify or otherwise select a second resource configuration for the PSFCH feedback transmission. The additional resources may be for the PSFCH and/or for a sidelink data channel (physical sidelink shared channel (PSSCH)), may be for a slot configured with PSFCH resources or a different slot (e.g., a non-PSFCH configured slot). Accordingly, the UEs may perform sidelink communications and the receiving UE may use the second resource allocation for the feedback message transmission.

A method for wireless communication at a first UE is described. The method may include determining that the first UE is to receive a sidelink transmission from a second UE, the sidelink transmission including a sidelink control channel and a sidelink data channel, receiving, based on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold, receiving the sidelink transmission from the second UE, and transmitting, to the second UE, the feedback message using the second resource configuration.

An apparatus for wireless communication at a first UE is described. The apparatus may include a processor, memory in electronic communication with the processor, and instructions stored in the memory. The instructions may be executable by the processor to cause the apparatus to determine that the first UE is to receive a sidelink transmission from a second UE, the sidelink transmission including a sidelink control channel and a sidelink data channel, receive, based on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold, receive the sidelink transmission from the second UE, and transmit, to the second UE, the feedback message using the second resource configuration.

Another apparatus for wireless communication at a first UE is described. The apparatus may include means for determining that the first UE is to receive a sidelink transmission from a second UE, the sidelink transmission including a sidelink control channel and a sidelink data channel, means for receiving, based on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold, means for receiving the sidelink transmission from the second UE, and means for transmitting, to the second UE, the feedback message using the second resource configuration.

A non-transitory computer-readable medium storing code for wireless communication at a first UE is described. The code may include instructions executable by a processor to determine that the first UE is to receive a sidelink transmission from a second UE, the sidelink transmission including a sidelink control channel and a sidelink data channel, receive, based on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold, receive the sidelink transmission from the second UE, and transmit, to the second UE, the feedback message using the second resource configuration.

Some examples of the method, apparatuses, and non-transitory computer-readable medium described herein may further include operations, features, means, or instructions for selecting, based on the first resource configuration failing to satisfy the resource threshold, a second slot to transmit the feedback message, the second slot being a different slot than the first slot.

Some examples of the method, apparatuses, and non-transitory computer-readable medium described herein may further include operations, features, means, or instructions for selecting, based on the first resource configuration failing to satisfy the resource threshold, a set of additional symbols of the slot for the second resource configuration, the set of additional symbols being different symbols than the two symbols allocated to the first resource configuration.

Some examples of the method, apparatuses, and non-transitory computer-readable medium described herein may further include operations, features, means, or instructions for transmitting the feedback message over the set of additional symbols or multiplexed over the set of additional symbols and the two symbols.

In some examples of the method, apparatuses, and non-transitory computer-readable medium described herein, receiving the indication may include operations, features, means, or instructions for receiving a scaler that allocates a first set of symbols to the sidelink data channel and a second set of symbols to the sidelink feedback channel for the feedback message.

Some examples of the method, apparatuses, and non-transitory computer-readable medium described herein may further include operations, features, means, or instructions for receiving the indication of the scaler in a SCI message.

In some examples of the method, apparatuses, and non-transitory computer-readable medium described herein, the SCI message includes one or more bits configured to explicitly indicate the scaler, one or more parameters set to values to implicitly indicate the scaler, or both.

Some examples of the method, apparatuses, and non-transitory computer-readable medium described herein may further include operations, features, means, or instructions for receiving the indication of the scaler in a layer three message via the sidelink data channel.

Some examples of the method, apparatuses, and non-transitory computer-readable medium described herein may further include operations, features, means, or instructions for transmitting sidelink control signaling using the second resource configuration, the sidelink control signaling being different from the feedback message.

In some examples of the method, apparatuses, and non-transitory computer-readable medium described herein, the second resource configuration may be for a slot of the sidelink data channel.

Some examples of the method, apparatuses, and non-transitory computer-readable medium described herein may further include operations, features, means, or instructions for transmitting the feedback message during a last two symbols of the slot for the sidelink data channel using a hybrid automatic repeat/request acknowledgement (HARQ-ACK) format message associated with a physical uplink control channel (PUCCH).

Some examples of the method, apparatuses, and non-transitory computer-readable medium described herein may further include operations, features, means, or instructions for multiplexing the feedback message with sidelink data to obtain a multiplexed message and transmitting the multiplexed message during the slot of the sidelink data channel.

Some examples of the method, apparatuses, and non-transitory computer-readable medium described herein may further include operations, features, means, or instructions for transmitting the feedback message, sidelink control signaling, or both, in a sidelink control information two format message via the sidelink data channel.

Some examples of the method, apparatuses, and non-transitory computer-readable medium described herein may further include operations, features, means, or instructions for transmitting the feedback message in a sidelink control information three message via the sidelink data channel.

Some examples of the method, apparatuses, and non-transitory computer-readable medium described herein may further include operations, features, means, or instructions for receiving, in the sidelink transmission via the sidelink data channel, a third resource configuration for the sidelink control information three message.

In some examples of the method, apparatuses, and non-transitory computer-readable medium described herein, the sidelink control information three message includes a HARQ-ACK format message associated with a PUCCH.

In some examples of the method, apparatuses, and non-transitory computer-readable medium described herein, the second resource configuration may be for a slot including the sidelink feedback channel.

Some examples of the method, apparatuses, and non-transitory computer-readable medium described herein may further include operations, features, means, or instructions for identifying, based on the first resource configuration, a last two symbols of the slot including the sidelink feedback channel and selecting an additional set of symbols of the slot for the second resource configuration.

Some examples of the method, apparatuses, and non-transitory computer-readable medium described herein may further include operations, features, means, or instructions for identifying, based on the first resource configuration, a last three symbols of the slot including the sidelink feedback channel and a gap period occurring prior to the sidelink feedback channel and receiving, based on the second resource configuration, the sidelink transmission via the sidelink data channel during one or more symbols of the last three symbols of the slot.

Some examples of the method, apparatuses, and non-transitory computer-readable medium described herein may further include operations, features, means, or instructions for identifying, based on the first resource configuration, a last three symbols of the slot including the sidelink feedback channel and a gap period occurring prior to the sidelink feedback channel and transmitting, based on the second resource configuration, the feedback message via the sidelink feedback channel during one or more symbols of the last three symbols of the slot.

A method for wireless communication at a first UE is described. The method may include determining that the first UE is to transmit a sidelink transmission to a second UE, the sidelink transmission including a sidelink control channel and a sidelink data channel, transmitting, based on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold, transmitting the sidelink transmission to the second UE, and receiving, from the second UE, a feedback message using the second resource configuration.

An apparatus for wireless communication at a first UE is described. The apparatus may include a processor, memory in electronic communication with the processor, and instructions stored in the memory. The instructions may be executable by the processor to cause the apparatus to determine that the first UE is to transmit a sidelink transmission to a second UE, the sidelink transmission including a sidelink control channel and a sidelink data channel, transmit, based on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold, transmit the sidelink transmission to the second UE, and receive, from the second UE, a feedback message using the second resource configuration.

Another apparatus for wireless communication at a first UE is described. The apparatus may include means for determining that the first UE is to transmit a sidelink transmission to a second UE, the sidelink transmission including a sidelink control channel and a sidelink data channel, means for transmitting, based on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold, means for transmitting the sidelink transmission to the second UE, and means for receiving, from the second UE, a feedback message using the second resource configuration.

A non-transitory computer-readable medium storing code for wireless communication at a first UE is described. The code may include instructions executable by a processor to determine that the first UE is to transmit a sidelink transmission to a second UE, the sidelink transmission including a sidelink control channel and a sidelink data channel, transmit, based on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold, transmit the sidelink transmission to the second UE, and receive, from the second UE, a feedback message using the second resource configuration.

Some examples of the method, apparatuses, and non-transitory computer-readable medium described herein may further include operations, features, means, or instructions for selecting, based on the first resource configuration failing to satisfy the resource threshold, a second slot to transmit the feedback message, the second slot being a different slot than the first slot.

Some examples of the method, apparatuses, and non-transitory computer-readable medium described herein may further include operations, features, means, or instructions for selecting, based on the first resource configuration failing to satisfy the resource threshold, a set of additional symbols of the slot for the second resource configuration, the set of additional symbols being different symbols than the two symbols allocated to the first resource configuration.

Some examples of the method, apparatuses, and non-transitory computer-readable medium described herein may further include operations, features, means, or instructions for transmitting the feedback message over the set of additional symbols or multiplexed over the set of additional symbols and the two symbols.

In some examples of the method, apparatuses, and non-transitory computer-readable medium described herein, transmitting the indication may include operations, features, means, or instructions for transmitting a scaler that allocates a first set of symbols to the sidelink data channel and a second set of symbols to the sidelink feedback channel for the feedback message.

Some examples of the method, apparatuses, and non-transitory computer-readable medium described herein may further include operations, features, means, or instructions for transmitting the indication of the scaler in a SCI message.

In some examples of the method, apparatuses, and non-transitory computer-readable medium described herein, the SCI message includes one or more bits configured to explicitly indicate the scaler, one or more parameters set to values to implicitly indicate the scaler, or both.

Some examples of the method, apparatuses, and non-transitory computer-readable medium described herein may further include operations, features, means, or instructions for transmitting the indication of the scaler in a layer three message via the sidelink data channel.

Some examples of the method, apparatuses, and non-transitory computer-readable medium described herein may further include operations, features, means, or instructions for receiving sidelink control signaling using the second resource configuration, the sidelink control signaling being different from the feedback message.

In some examples of the method, apparatuses, and non-transitory computer-readable medium described herein, the second resource configuration may be for a slot of the sidelink data channel.

Some examples of the method, apparatuses, and non-transitory computer-readable medium described herein may further include operations, features, means, or instructions for receiving the feedback message during a last two symbols of the slot for the sidelink data channel using a HARQ-ACK format message associated with a PUCCH.

Some examples of the method, apparatuses, and non-transitory computer-readable medium described herein may further include operations, features, means, or instructions for receiving a multiplexed message during the slot of the sidelink data channel, the multiplexed message obtained by the second UE multiplexing the feedback message with sidelink data.

Some examples of the method, apparatuses, and non-transitory computer-readable medium described herein may further include operations, features, means, or instructions for receiving the feedback message, sidelink control signaling, or both, in a sidelink control information two format message via the sidelink data channel.

Some examples of the method, apparatuses, and non-transitory computer-readable medium described herein may further include operations, features, means, or instructions for receiving the feedback message in a sidelink control information three message via the sidelink data channel.

Some examples of the method, apparatuses, and non-transitory computer-readable medium described herein may further include operations, features, means, or instructions for transmitting, in the sidelink transmission via the sidelink data channel, a third resource configuration for the sidelink control three message.

In some examples of the method, apparatuses, and non-transitory computer-readable medium described herein, the sidelink control information three message includes a HARQ-ACK format message associated with a PUCCH.

In some examples of the method, apparatuses, and non-transitory computer-readable medium described herein, the second resource configuration may be for a slot including the sidelink feedback channel.

Some examples of the method, apparatuses, and non-transitory computer-readable medium described herein may further include operations, features, means, or instructions for identifying, based on the first resource configuration, a last two symbols of the slot including the sidelink feedback channel and selecting an additional set of symbols of the slot for the second resource configuration.

Some examples of the method, apparatuses, and non-transitory computer-readable medium described herein may further include operations, features, means, or instructions for identifying, based on the first resource configuration, a last three symbols of the slot including the sidelink feedback channel and a gap period occurring prior to the sidelink feedback channel and transmitting, based on the second resource configuration, the sidelink transmission via the sidelink data channel during one or more symbols of the last three symbols of the slot.

Some examples of the method, apparatuses, and non-transitory computer-readable medium described herein may further include operations, features, means, or instructions for identifying, based on the first resource configuration, a last three symbols of the slot including the sidelink feedback channel and a gap period occurring prior to the sidelink feedback channel and receiving, based on the second resource configuration, the feedback message via the sidelink feedback channel during one or more symbols of the last three symbols of the slot.

BRIEF DESCRIPTION OF THE DRAWINGS

FIG. 3 illustrates an example of a feedback configuration that supports dynamic configuration of PSFCH format in accordance with aspects of the present disclosure.

DETAILED DESCRIPTION

Wireless communications support sidelink communications (e.g., inter-user equipment (UE) communications via sidelink channels). Sidelink protocols support hybrid automatic repeat/request (HARQ) feedback signaling via a physical sidelink feedback channel (PSFCH). The PSFCH resources may be enabled for unicast and groupcast transmissions and may be configured during the last two symbols of a slot. However, this limited resource allocation results in reliability issues for the PSFCH transmissions. For example, certain transmission types (e.g., HARQ negative-acknowledgement-to-acknowledgement (NACK-to-ACK), industrial internet-of-things (IIoT), etc.) have an associated reliability requirement. The resources typically allocated to PSFCH may not provide sufficient resources to satisfy the corresponding reliability requirements.

Aspects of the disclosure are initially described in the context of wireless communications systems. Broadly, the techniques described herein provide for a dynamic PSFCH configuration. For example, two UEs may determine that the conventional PSFCH resource allocation is insufficient to support HARQ feedback reporting. Accordingly, the UEs may identify or otherwise select a second resource configuration for the PSFCH feedback transmission. The additional resources may be for the PSFCH and/or for a sidelink data channel (physical sidelink shared channel (PSSCH)), may be for a slot configured with PSFCH resources or a different slot (e.g., a non-PSFCH configured slot). Accordingly, the UEs may perform sidelink communications and the receiving UE may use the second resource allocation for the feedback message transmission.

Aspects of the disclosure are further illustrated by and described with reference to apparatus diagrams, system diagrams, and flowcharts that relate to dynamic configuration of PSFCH format.

Figure 1:
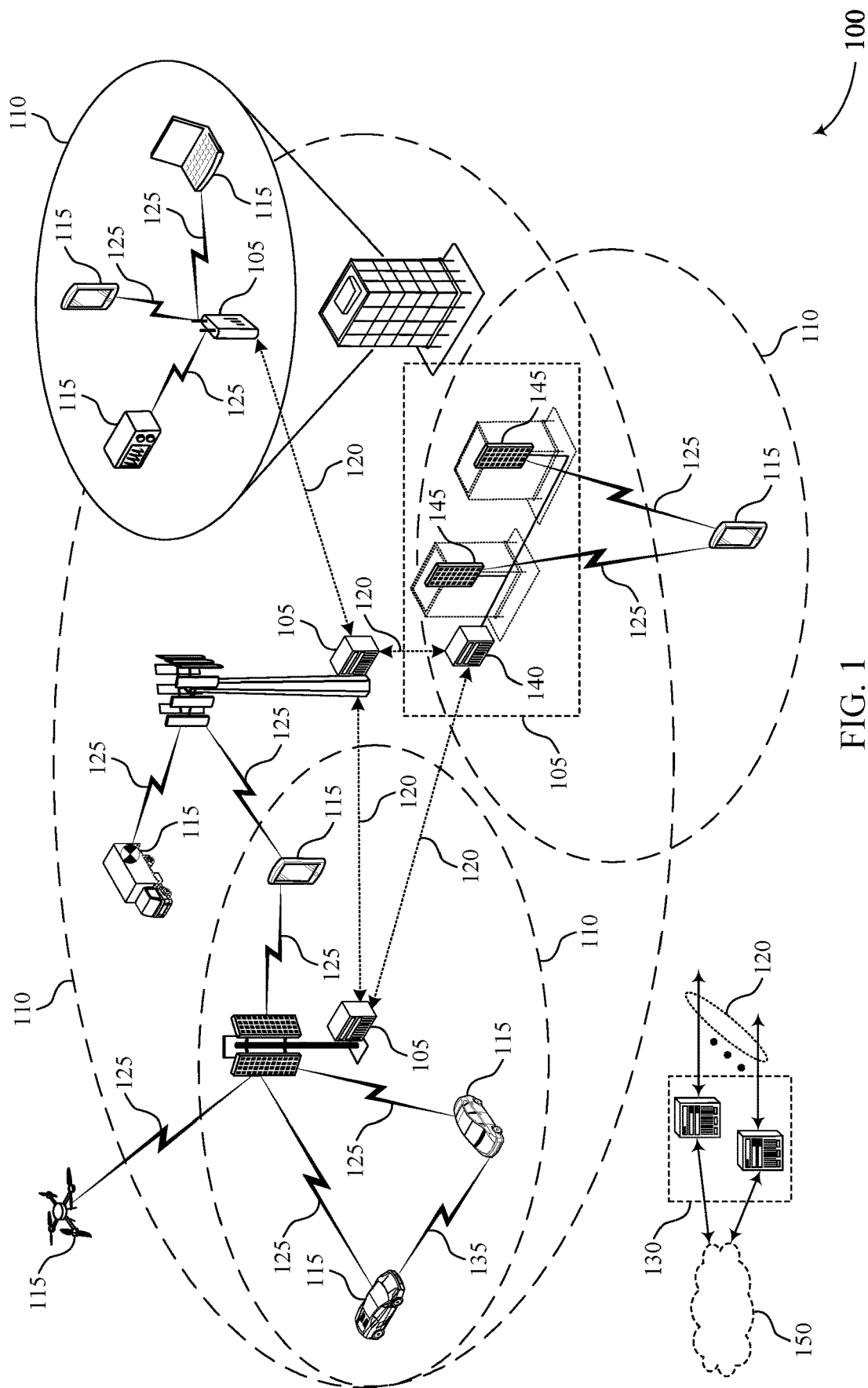
FIG. 1 illustrates an example of a wireless communications system that supports dynamic configuration of physical sidelink feedback channel (PSFCH) format in accordance with aspects of the present disclosure.

FIG. 1 illustrates an example of a wireless communications system 100 that supports dynamic configuration of PSFCH format in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 (e.g., a first UE in this example, which may also be referred to as a receiving device) may determine that the first UE is to receive a sidelink transmission from a second UE (e.g., a UE 115, which may also be referred to as a transmitting device in this example), the sidelink transmission comprising a sidelink control channel and a sidelink data channel. The UE 115 may receive, based at least in part on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold. The UE 115 may receive the sidelink transmission from the second UE. The UE 115 may transmit, to the second UE, the feedback message using the second resource configuration.

A UE 115 (e.g., a first UE in this example, which may also be referred to as a transmitting device) may determine that the first UE is to transmit a sidelink transmission to a second UE, the sidelink transmission comprising a sidelink control channel and a sidelink data channel. The UE 115 may transmit, based at least in part on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold. The UE 115 may transmit the sidelink transmission to the second UE. The UE 115 may receive, from the second UE, a feedback message using the second resource configuration.

That is, references herein to a first UE and/or a second UE may depend on the context/perspective of that particular discussion. For example, in some situations the first UE may refer to a UE 115 receiving sidelink communications from a second UE and transmitting a feedback message to the second UE for the sidelink communications. In that example, the first UE may refer to the receiving device (e.g., the UE 115 receiving the sidelink communications and transmitting the feedback message) and the second UE may refer to the transmitting device (e.g., the UE 115 transmitting the sidelink communications and receiving the feedback message from the first UE). In other examples, the first UE may refer to a UE 115 transmitting sidelink communications to a second UE and receiving a feedback message from the second UE for the sidelink communications. In that example, the first UE may refer to the transmitting device (e.g., the UE 115 transmitting the sidelink communications and receiving the feedback message) and the second UE may refer to the receiving device (e.g., the UE 115 receiving the sidelink communications and transmitting the feedback message to the first UE). Accordingly, aspects of the techniques described herein may use the terms transmitting device and receiving device, rather than first UE/second UE, for simplicity.

Figure 2:
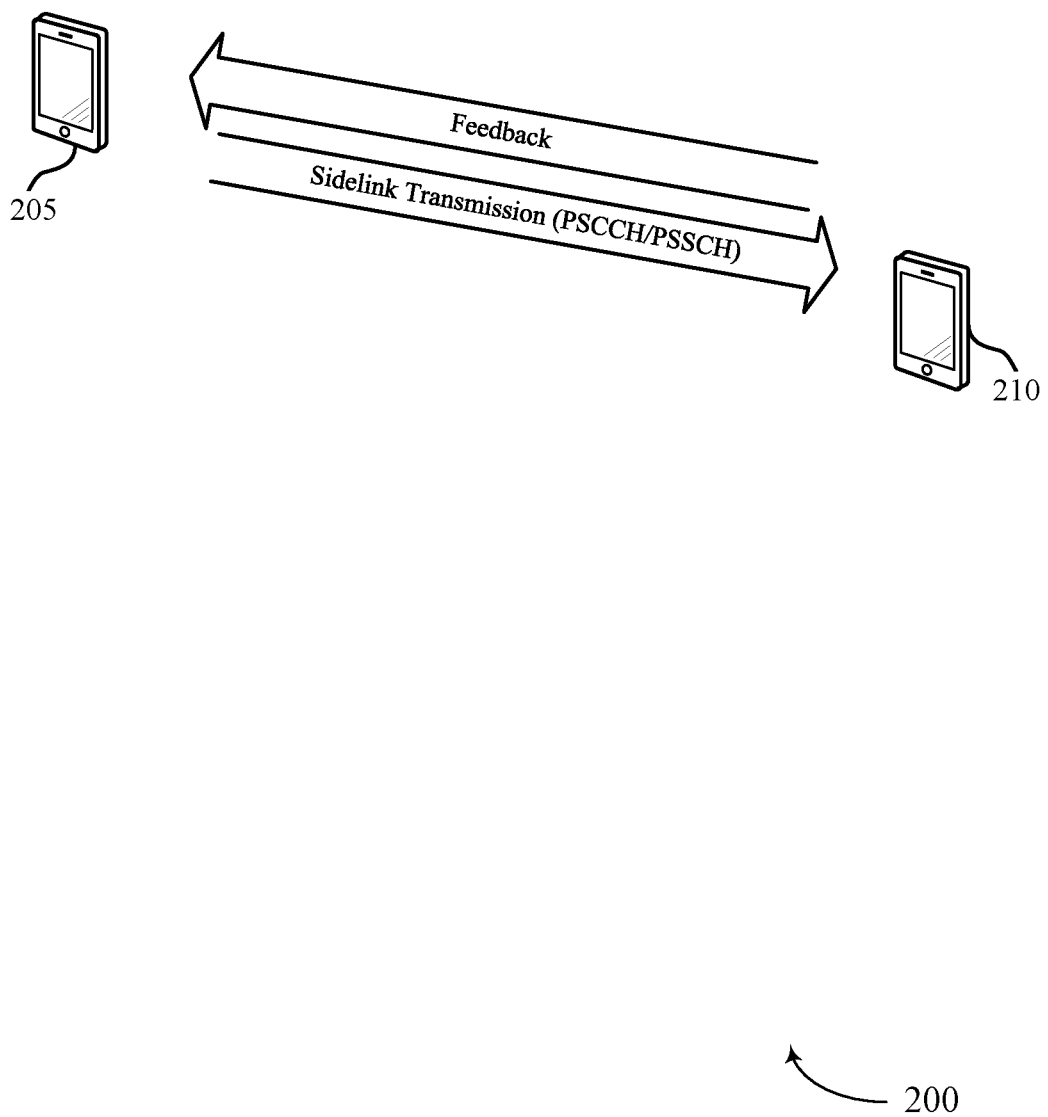
FIG. 2 illustrates an example of a wireless communication system that supports dynamic configuration of PSFCH format in accordance with aspects of the present disclosure.

FIG. 2 illustrates an example of a wireless communications system 200 that supports dynamic configuration of PSFCH format in accordance with aspects of the present disclosure. Wireless communications system 200 may implement aspects of wireless communications system 100. Wireless communications system 200 may include UE 205 and UE 210, which may be examples of the corresponding devices described herein. Generally, UE 205 may be referred to as a transmitting device and UE 210 may be referred to as a receiving device.

Wireless communications system 200 may support sidelink communications (e.g., inter-UE communications via sidelink channel(s)). Sidelink protocols support HARQ feedback signaling via a sidelink feedback channel (e.g., PSFCH). The PSFCH resources may be enabled for unicast and groupcast transmissions. For example, the PSFCH resources may use a PUCCH format 0 waveform structure. The PSFCH resources may use one bit to convey acknowledgment/negative-acknowledgment (ACK/NACK) feedback for unicast transmissions. For groupcast transmissions, the PSFCH resources may be used to indicate NACK-only or may be used for ACK/NACK feedback. Such legacy PSFCH resources may also be referred to as a first resource configuration.

The PSFCH resources (e.g., the first resource configuration) may be configured during the last two symbols of a slot, may have a corresponding period (e.g., {0, 1, 2, 4}), and may use a zero ("0") to indicate that PSFCH is disabled. Such indication may typically be carried in one bit of SCI-1 (which is typically carried or otherwise conveyed via PSCCH). The PSFCH resources may have a minimum time gap of two or three symbols (e.g., {2, 3}), which generally defines the time gap between receiving a PSSCH reception and the corresponding PSFCH feedback. The PSFCH resources may support cyclic shifting pairs for the PSFCH transmission, with the number of cyclic shift pairs corresponding to {1, 2, 3, 4, 6}. Generally, the PSFCH resources may be (pre-)configured using a rbSetPSFCH bitmap (e.g., carried in configuration signaling).

However, the limited resource allocation of the first resource configuration results in reliability issues for certain PSFCH transmissions. Certain transmission types (e.g., HARQ negative-acknowledgement-to-acknowledgement (NACK-to-ACK) signaling, industrial internet-of-things (IIoT) traffic, vehicle-based traffic, etc.) may have an associated reliability requirement, quality-of-service (QoS) requirements, and the like. For example, a signal-to-noise (SNR) ratio for a NACK-to-ACK failure rate may be 0.001 with PUCCH format 1 (e.g., one resource block with up to 14 symbols, seven orthogonal cover codes (OCCs), etc.). The typical sidelink PSFCH resources design, however, may require a significantly larger SNR by log(7) (e.g., seven times more spreading than PUCCH format 1), which is about 5 dB to achieve 0.001. However, IIoT traffic target requirement may be 0.0001. Accordingly, the resources typically allocated to PSFCH (e.g., the first resource configuration) may not provide sufficient resources to satisfy the corresponding reliability requirements (e.g., may fail to satisfy a resource threshold). Therefore, current PSFCH resource design does not provide a sufficiently reliable resource allocation to support certain traffic types (e.g., IIoT, which is E2E $10^{-6}$). Because of such shortcomings, utilization of PSFCH configured resources is low (e.g., as little as 1%).

Accordingly, aspects of the described techniques provide a significant reliability boost for HARQ feedback signaling. In particular, aspects of the described techniques provide for the transmitting device to dynamically configure the resources for the receiving device to transmit HARQ feedback signaling. For example, the transmitting device may identify or otherwise determine that a sidelink transmission is to be transmitted to a receiving device. In this context, the sidelink transmission may include the sidelink control channel (e.g., PSCCH) transmission of SCI-1 and the sidelink data channel (e.g., PSSCH) transmission of SCI-2 as well as the sidelink data/information being transmitted via PSSCH. The receiving device may receive the sidelink transmission and respond with a feedback message (e.g., indicating NACK-only, ACK/NACK feedback signaling, etc.).

As discussed above, the PSFCH resource typically configured for the last two symbols (e.g., a first resource configuration) of a slot may be insufficient for the feedback signaling. That is, the transmitting device and the receiving device may both identify or otherwise determine that the first resource configuration (e.g., the PSFCH resources typically configured for the last two symbols of a slot) fails to satisfy a resource threshold. Broadly, the resource threshold may refer to the amount of time, frequency, spatial, and/or code resources, allocated in the last two symbols of the slot carrying the sidelink transmission. For example, the transmitting device and receiving device may determine that the typical PSFCH resource configuration allocated for the last two symbols of the slot may not provide sufficient resources to satisfy latency, QoS, and/or reliability requirements for the HARQ feedback (e.g., the feedback message).

Accordingly, the transmitting device may dynamically select a second resource configuration (e.g., having additional time, frequency, spatial, and/or code resources) to use for feedback message signaling from the receiving device. The transmitting device may select the second resource configuration (e.g., the additional resources) autonomously and/or based on resources allocated from a base station managing aspects of the sidelink communications. For example, the transmitting device may select the second resource configuration from a resource pool associated with sidelink communications and/or may send a request to the base station for additional resources, with the base station providing additional resources to the transmitting device.

Accordingly, the transmitting device may transmit or otherwise provide an indication of the second resource configuration to the receiving device. In this context, the second resource configuration may satisfy the resource threshold for feedback message signaling from the receiving device in response to the sidelink transmission. Accordingly, the transmitting device may transmit the sidelink transmission to the receiving device, and the receiving device may respond by transmitting a feedback message to the transmitting device using the resources associated with the second resource configuration. Broadly, the feedback message may convey NACK-only information, may convey ACK/NACK information, and the like, for the sidelink transmission.

Initially, the transmitting device may occupy the entire slot that the sidelink transmission is to occur. This may typically include three symbols of the slot (e.g., the two symbols at the end of the slot allocated to PSFCH according to the first resource configuration as well as a gap symbol between PSSCH and PSFCH symbols), which may leave 10 symbols of the slot for the sidelink transmission. In some examples, the transmitting device may dynamically configure the PSFCH length (e.g., the duration and/or amount of other resources) for the receiving device to use for feedback message signaling. Accordingly, the transmitting device may have 10–X1 (ten minus X1) symbols of the slot available for the sidelink transmission and the receiving device may have 2+X1 (two plus X1) symbols of the slot available for PSFCH, where X1 is a scaler that allocates a first set of symbols to the sidelink data channel (e.g., PSSCH) and a second set of symbols to PSFCH for the feedback message. Accordingly, this may improve the reliability and/or payload size for the feedback message signaling and/or other sidelink control signaling or short data transmission from the receiving device. For example, the receiving device may send a scheduling request (SR) via PSFCH (e.g., the second resource configuration), CSI, and/or other signaling/information.

In some aspects, the scaler X1 may be indicated to the receiving device by the transmitting device. That is, the transmitting device may transmit an indication of the second resource configuration (which may be an indication of the scaler X1 in this example) to the receiving device. In some examples, the transmitting device may simply identify which resources are allocated to the second resource configuration (e.g., on a frequency/subchannel basis, symbol basis, spatial basis, etc.). Accordingly, the receiving device may receive the scaler allocating the first set of symbols to the sidelink data channel and the second set of symbols to the sidelink feedback channel for the feedback message.

In some aspects, the scaler X1 may be indicated via SCI. In some examples, this may include the transmitting device transmitting the indication of the scaler X1 (and/or the indication of the resources forming the second resource configuration) in SCI-1 (e.g., using the PSFCH indicator and/or reserved bits of SCI-1) and/or in SCI-2 (e.g., using the format bits and/or special time domain resource allocator (TDRA)/frequency domain resource allocator (FDRA) fields of SCI-2). The indication of the X1 scaler may be explicitly indicated via bit(s) or bit combination(s) in SCI-1, e.g., using a specific CRC scrambling sequence, TDRA/FDRA, etc. The indication of the X1 scaler may be implicitly indicated, e.g., priority based for certain priority traffic, PSFCH length preconfigured, or triggered by enabling a CSI-report. The number of DMRS pattern may vary depending on the length of PSSCH, e.g., one pattern for PSSCH=6, a second pattern for PSSCH=9, and so on.

When the X1 scaler is indicated in SCI-2 (e.g., via PSSCH), this may include adding a new SCI-2 format or a new field indicating X1 (and/or the indication of the resources forming the second resource configuration). In some aspects, SCI-2 rate matching may need a re-scaling if PSSCH is shorter than the receiving device expects (e.g., alpha sl-scaling).

In some examples, the indication of the second resource configuration (e.g., the X1 scaler and/or the indication of the resources forming the second resource configuration) may be transmitted in upper layer signaling (e.g., in L3 signaling) in PSSCH. This may begin with the first resource configuration (e.g., the short PSFCH in the last two symbols of the slot). The transmitting device may then transmit the indication in PSSCH of the format for PSFCH going forward (e.g., for future sidelink transmissions).

In some examples, the dynamic configuration of feedback message signaling resources may be for slots containing the legacy PSFCH format (e.g., the first resource configuration with the last two symbols of the slot allocated to PSFCH) or for slots without the legacy PSFCH. That is, in some examples the second resource configuration may be selected to include a second slot for transmitting the feedback message. In this example, the first resource configuration may be configured for a first slot (e.g., the slot containing the two symbols allocated to the first resource configuration) and the second resource configuration may be configured for the second slot (e.g., a different slot). Accordingly, the receiving device may select the second slot to transmit the feedback message.

In some examples, the second resource configuration may be selected to include a set of additional symbols of the slot. The set of additional symbols may be different symbols of the slot that the first resource configuration is configured in. In this example, the receiving device may transmit the feedback message over the set of additional symbols or may multiplex the feedback message over the set of additional symbols and the two symbols configured for the PSFCH feedback. In some aspects, the resources of the second resource configuration may be PSFCH resources (e.g., specifically for PSFCH feedback message signaling) and/or may be PSSCH resources (e.g., may reallocate resources of PSSCH for feedback message signaling, such as feedback resources).

Accordingly, the receiving device may determine whether it is able to successfully receive and decode the sidelink transmission (e.g., which may include SCI-1, SCI-2, and/or PSSCH data). The receiving device may then construct the feedback message and transmit the feedback message to the transmitting device using the second resource configuration.

FIG. 3 illustrates an example of a feedback configuration 300 that supports dynamic configuration of PSFCH format in accordance with aspects of the present disclosure. Feedback configuration 300 may implement aspects of wireless communications systems 100 and/or 200. Aspects of feedback configuration 300 may be implemented by or implemented at a UE, which may be an example of the corresponding device described herein.

As discussed above, aspects of the described techniques provide for a transmitting device performing a sidelink transmission to a receiving device to dynamically configure a second resource configuration for the receiving device to transmit a feedback message. For example, the transmitting device and receiving device may identify or otherwise determine that a sidelink transmission is to be performed from the transmitting device to the receiving device. For example, this may be based on identifying, selecting, receiving, etc., data/information for transmission to the receiving device. In some aspects, this may be in response to a request from the receiving device for the sidelink transmission. Broadly, the sidelink transmission may include a sidelink control channel (e.g., PSCCH 305) carrying SCI-1 and a sidelink data channel (e.g., PSSCH 310) carrying SCI-2 and the sidelink data/information being transmitted.

The transmitting device may identify or otherwise determine that a first resource configuration (e.g., legacy PSFCH resources configured for the last two symbols of a slot) fails to satisfy a resource threshold for transmitting the feedback message. For example, the transmitting device may identify or otherwise determine that the first resource configuration does not contain or otherwise allocate sufficient resources for the feedback message transmission to satisfy a reliability requirement, a latency requirement, a QoS requirement, and the like, for the feedback message. Accordingly, the transmitting device may transmit an indication of a second resource configuration to the receiving device. The transmitting device may transmit an explicit indication of the resources in the second resource configuration and/or may transmit an X1 scaler to be used by the receiving device to identify the resources of the second resource configuration. The second resource configuration may be for the receiving device to transmit the feedback message to the transmitting device. Broadly, the second resource configuration may include additional resources (e.g., more resources) and/or different resources than the first resource configuration in order to satisfy the resource threshold. The transmitting device may transmit the indication of the second resource configuration in SCI-1, SCI-2, upper layer signaling (e.g., L3 signaling), and/or using a new format SCI-3 message carried in PSSCH. Accordingly, the transmitting device may transmit the sidelink transmission to the receiving device, which respond by transmitting the feedback message using the second resource configuration.

Feedback configuration 300 illustrates a non-limiting example where the transmitting device selects or otherwise identifies the second resource configuration in non-PSFCH configured slots. That is, the transmitting device may dynamically configure the PSFCH length (e.g., the second resource configuration) for the feedback message from the receiving device. Feedback configuration 300 illustrates an example where the dynamic configuration is for resources in a slot that are not configured with the legacy PSFCH resources (e.g., the first resource configuration spanning the last two symbols of the slot). That is, the transmitting and/or receiving devices may select a second slot to transmit the feedback message that is different than the slot that the first resource configuration is configured during.

Accordingly, the transmitting device may schedule the sidelink transmission to the receiving device during the second slot (as shown in feedback configuration 300), which includes the sidelink control channel (e.g., PSCCH 305) spanning the first three symbols of the slot and over a first subset of the frequency band used for sidelink communications. The transmitting device may schedule the sidelink transmission to the receiving device which includes the sidelink data channel (e.g., PSSCH 310) spanning a second subset of the frequency band during the first three symbols of the slot and then spanning the full frequency band during the next three symbols of the slot. The sidelink transmission may be followed by a gap period during the sixth symbol of the slot to allow for transition from a receive mode to a transmit mode by the receiving device and/or transition from a transmit mode to a receive mode by the transmitting device. The second resource configuration for PSFCH 315 in this example may then span symbols 7-12 of the slot, with symbol 13 again being allocated or otherwise designated as a gap symbol to allow transition. Accordingly, the transmitting device may perform the sidelink transmission during one or more of symbols 0-5 of the slot and then the receiving device may transmit the feedback message during one or more of symbols 7-12 of the slot.

In some aspects, all of the resources in the second resource configuration (e.g., the PSFCH 315 resources) may be used for transmitting the feedback message and/or other sidelink control signaling for a data transmission. The format for PSFCH 315 (e.g., the second resource configuration) may be configured by the transmitting device for each receiving device and may generally correspond to the time, frequency, spatial, code, and the like, resources allocated for PSFCH 315. For example, the second resource configuration may indicate or otherwise identify the number of resource blocks, the number of symbols, and the like, for the feedback message transmission. In the situation where the receiving device has the feedback message for transmission, it may multiplex the feedback message with the sidelink control signaling and/or other data/information transmission on the PSFCH 315 resources corresponding to the second configuration. Waveform configurations for the second resource configuration of PSFCH 315 may utilize NR techniques and/or may be more similar to PUSCH or PUCCH format techniques.

Although not shown in feedback configuration 300, in some examples the dynamic configuration of PSFCH 315 resources in the second resource configuration may be for slots that include the legacy PSFCH (e.g., in slots that include the last two symbols allocated to PSFCH according to the first resource configuration). That is, a set of additional symbols of the slot may be selected for the second resource configuration that are different than the two symbols allocated to the first resource configuration at the end of the slot. In this example, the last two symbols may be used by other devices as well as by the receiving devices for reporting HARQ (e.g., the feedback message signaling). The receiving device may avoid using the legacy PSFCH symbols (e.g., the last two symbols) according to the first resource configuration and, instead, use the first X1 symbols of the slot. The waveform configuration for this example may utilize the sequence-based PSFCH techniques or may be different.

In some aspects, the receiving device may decode PSCCH 305 and PSSCH 310 to determine the second resource configuration (e.g., the second resource configuration). For example, the receiving device may decode PSSCH 310 according to the number of symbols allocated to PSSCH 310. After the gap symbol, a receiving device may use the long format PSFCH (e.g., PSFCH 315 according to the second resource configuration) for transmitting sidelink control signaling and/or data. The sidelink control signaling and/or data may be multiplexed with the HARQ if the receiving device has ACK/NACK information to indicate in the feedback message. In some aspects, the first symbol of PSFCH 315 (e.g., symbol 7 in this example) may be used for automatic gain control (AGC).

In some aspects, the last two symbols of PSFCH 315 (e.g., symbols 11 and 12 in this example) may be used by legacy devices (e.g., for reporting ACK/NACK for sidelink transmissions that were received a "TimeGap" slot earlier). In some examples, if the slot does not contain PSFCH resources, no legacy device would be expected to transmit during the symbols.

Figure 4A:
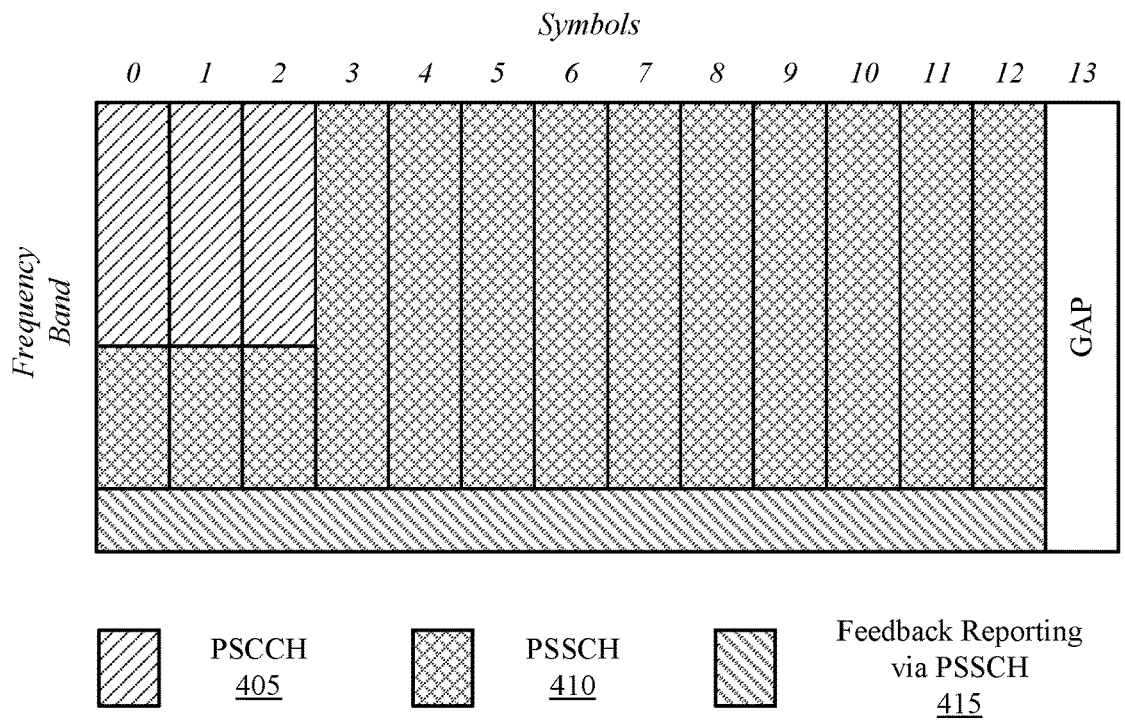
FIGS. 4A and 4B illustrate an example of a feedback configuration that supports dynamic configuration of PSFCH format in accordance with aspects of the present disclosure.
Figure 4B:
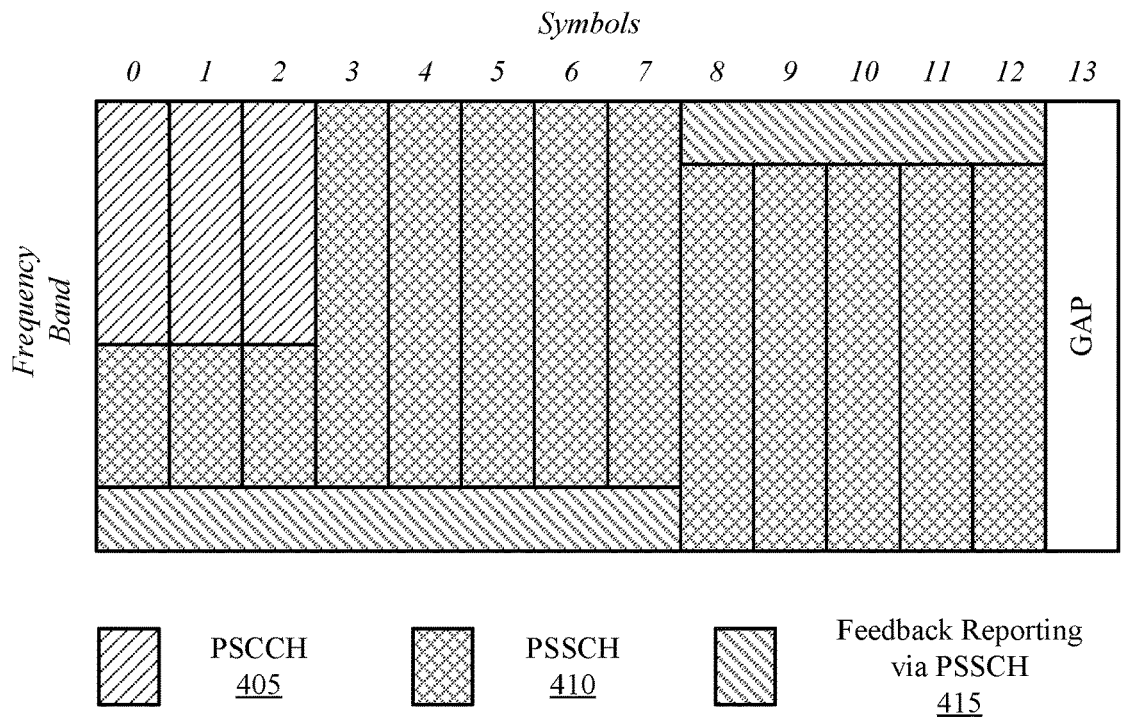

FIGS. 4A and 4B illustrate an example of a feedback configuration 400 that supports dynamic configuration of PSFCH format in accordance with aspects of the present disclosure. Feedback configuration 400 may implement aspects of wireless communications systems 100 and/or 200 and/or feedback configuration 300. Aspects of feedback configuration 400 may be implemented by or implemented at a UE, which may be an example of the corresponding device described herein.

As discussed above, aspects of the described techniques provide for a transmitting device performing a sidelink transmission to a receiving device to dynamically configure a second resource configuration for the receiving device to transmit a feedback message. For example, the transmitting device and receiving device may identify or otherwise determine that a sidelink transmission is to be performed from the transmitting device to the receiving device. For example, this may be based on identifying, selecting, receiving, etc., data/information for transmission to the receiving device. In some aspects, this may be in response to a request from the receiving device for the sidelink transmission. Broadly, the sidelink transmission may include a sidelink control channel (e.g., PSCCH 405) carrying SCI-1 and a sidelink data channel (e.g., PSSCH 410) carrying SCI-2 and the sidelink data/information being transmitted.

The transmitting device may identify or otherwise determine that a first resource configuration (e.g., legacy PSFCH resources configured for the last two symbols of a slot) fails to satisfy a resource threshold for transmitting the feedback message. For example, the transmitting device may identify or otherwise determine that the first resource configuration does not contain or otherwise allocate sufficient resources for the feedback message transmission to satisfy a reliability requirement, a latency requirement, a QoS requirement, and the like, for the feedback message. Accordingly, the transmitting device may transmit an indication of a second resource configuration to the receiving device. The transmitting device may transmit an explicit indication of the resources in the second resource configuration and/or may transmit an X1 scaler to be used by the receiving device to identify the resources of the second resource configuration. The second resource configuration may be for the receiving device to transmit the feedback message to the transmitting device. Broadly, the second resource configuration may include additional resources (e.g., more resources) than the first resource configuration in order to satisfy the resource threshold. The transmitting device may transmit the indication of the second resource configuration in SCI-1, SCI-2, upper layer signaling (e.g., L3 signaling), and/or using a new format SCI-3 message carried in PSSCH. Accordingly, the transmitting device may transmit the sidelink transmission to the receiving device, which respond by transmitting the feedback message using the second resource configuration.

In some examples, the second resource configuration may be resources of the sidelink data channel (e.g., feedback resources 415 of PSSCH 410 allocated for feedback reporting via PSSCH). Accordingly, the receiving device may use PSSCH 410 for HARQ-ACK feedback reporting to the transmitting device for the sidelink transmission. In some examples, this may support NR-U sidelink where a deterministic bidirectional traffic exchange is expected.

Feedback configuration 400 illustrates an example where the second resource configuration uses slots without the legacy PSFCH allocations (e.g., the first resource configuration spanning the last two symbols of the slot prior to the gap symbol). That is, the second resource configuration is for a slot of the sidelink data channel (e.g., such as a slot having PSCCH 405 and PSSCH 410, but not otherwise having any PSFCH resource configured). In some aspects, this may include the receiving device using the last two symbols of the slot for HARQ-ACK with PUCCH-0 format (e.g., the receiving device may transmit the feedback message during the last two symbols of the slot for the sidelink data channel using a HARQ-ACK format message associated with the PUCCH).

In some aspects, HARQ (e.g., the feedback message) may be multiplexed in PSSCH via a logical channel (e.g., the receiving device may multiplex the feedback message with sidelink data to obtain a multiplexed message and transmit the multiplexed message during the slot of the sidelink data channel). In some aspects, a new format of SCI-2 may be used to enable the receiving devices report of a SR, CSI, HARQ-ACK, and the like (e.g., the receiving device may transmit the feedback message and/or sidelink control signaling in SCI-2 format message via the sidelink data channel).

In some aspects, a new format SCI-3 message may be used for transmitting the feedback message (e.g., the receiving device may transmit the feedback message in SCI-3 via the sidelink data channel). In some examples, SCI-2 may be formatted to indicate the format and existence of SCI-3 (e.g., the second resource configuration used for the feedback message transmission, which may be referred to as a third resource configuration in some examples). The SCI-3 message format may be similar to a PUCCH-1 or PUCCH-4 format, and may correspond to the feedback resource 415 portions of PSSCH 410.

For example, and with reference to feedback configuration 400-a of FIG. 4A, SCI-3 conveying the feedback message may be transmitted in the last resource blocks of the lowest subchannel (e.g., when PSCCH 405 does not occupy only one subchannel). The SCI-3 conveying the feedback message may be transmitted in other subchannels if PSCCH 405 occupies one subchannel and PSSCH 410 has more than one subchannel. In some examples, SCI-3 may not be supported if PSCCH 405 and PSSCH 410 occupy only one subchannel. If PSCCH 405 and PSSCH 410 occupy one subchannel, in some examples SCI-3 may be supported and use only the available symbols of the slot to convey the feedback message.

Feedback configuration 400-b of FIG. 4B illustrates an example where SCI-3 is enabled for intra-slot hopping. For example, the second resource configuration including feedback resources 415 may span a first subchannel or subcarrier during a first set of symbols of the slot, and then may hop to a second subchannel or subcarrier during a second set of symbols of the slot. Accordingly, the receiving device may transmit the feedback message using frequency hopping techniques.

FIG. 5 illustrates an example of a feedback configuration 500 that supports dynamic configuration of PSFCH format in accordance with aspects of the present disclosure. Feedback configuration 500 may implement aspects of wireless communications systems 100 and/or 200 and/or feedback configuration 300 and/or 400. Aspects of feedback configuration 500 may be implemented by or implemented at a UE, which may be an example of the corresponding device described herein.

As discussed above, aspects of the described techniques provide for a transmitting device performing a sidelink transmission to a receiving device to dynamically configure a second resource configuration for the receiving device to transmit a feedback message. For example, the transmitting device and receiving device may identify or otherwise determine that a sidelink transmission is to be performed from the transmitting device to the receiving device. For example, this may be based on identifying, selecting, receiving, etc., data/information for transmission to the receiving device. In some aspects, this may be in response to a request from the receiving device for the sidelink transmission. Broadly, the sidelink transmission may include a sidelink control channel (e.g., PSCCH 505) carrying SCI-1 and a sidelink data channel (e.g., PSSCH 510) carrying SCI-2 and the sidelink data/information being transmitted.

The transmitting device may identify or otherwise determine that a first resource configuration (e.g., legacy PSFCH resources configured for the last two symbols of a slot) fails to satisfy a resource threshold for transmitting the feedback message. For example, the transmitting device may identify or otherwise determine that the first resource configuration does not contain or otherwise allocate sufficient resources for the feedback message transmission to satisfy a reliability requirement, a latency requirement, a QoS requirement, and the like, for the feedback message. Accordingly, the transmitting device may transmit an indication of a second resource configuration to the receiving device. The transmitting device may transmit an explicit indication of the resources in the second resource configuration and/or may transmit an X1 scaler to be used by the receiving device to identify the resources of the second resource configuration. The second resource configuration may be for the receiving device to transmit the feedback message to the transmitting device. Broadly, the second resource configuration may include additional resources (e.g., more resources) than the first resource configuration in order to satisfy the resource threshold. The transmitting device may transmit the indication of the second resource configuration in SCI-1, SCI-2, upper layer signaling (e.g., L3 signaling), and/or using a new format SCI-3 message carried in PSSCH. Accordingly, the transmitting device may transmit the sidelink transmission to the receiving device, which respond by transmitting the feedback message using the second resource configuration.

In some examples, the second resource configuration may be resources of the sidelink data channel (e.g., feedback resources 515 of PSSCH 510 allocated for feedback reporting via PSSCH). Accordingly, the receiving device may use PSSCH 510 for HARQ-ACK feedback reporting to the transmitting device for the sidelink transmission.

Feedback configuration 500 illustrate an example where the second resource configuration uses slots without the legacy PSFCH allocations (e.g., the first resource configuration spanning the last two symbols of the slot prior to the gap symbol). That is, the second resource configuration is for a slot of the sidelink data channel (e.g., such as a slot having PSCCH 505 and PSSCH 510, but not otherwise having any PSFCH resource configured).

In some aspects, a new format SCI-3 message may be used for transmitting the feedback message (e.g., the receiving device may transmit the feedback message in SCI-3 via the sidelink data channel). In some examples, SCI-2 may be formatted to indicate the format and existence of SCI-3 (e.g., the second resource configuration used for the feedback message transmission, which may be also be referred to as a third resource configuration in some examples).

Figure 5A:
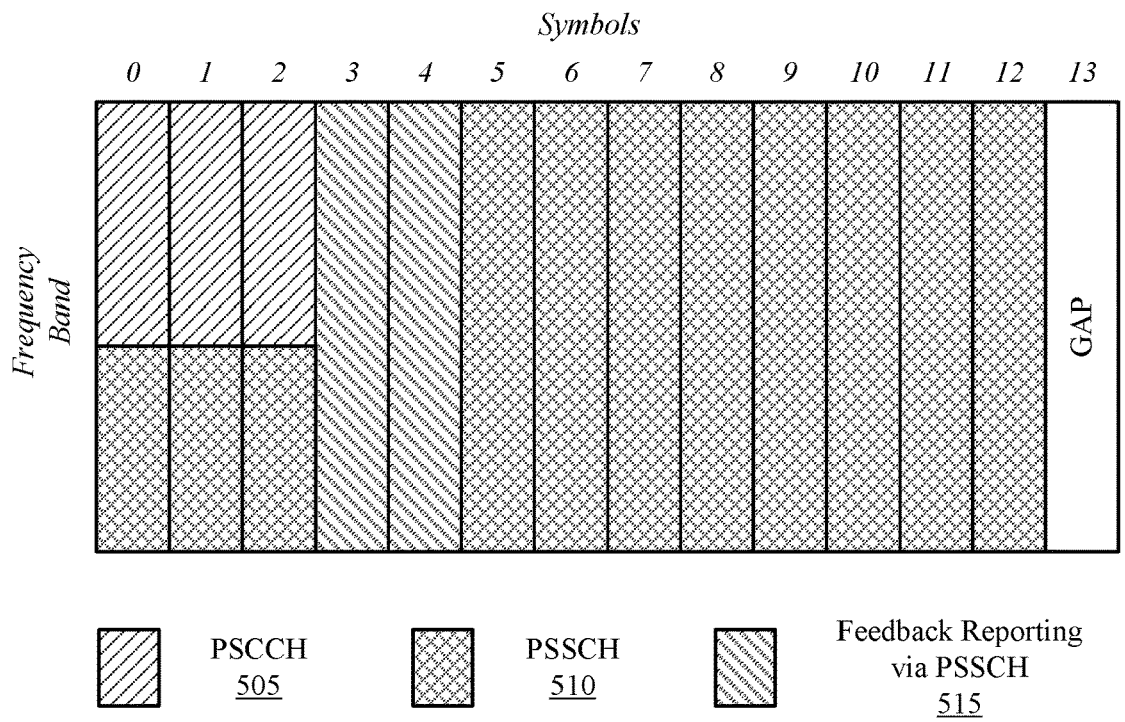
FIGS. 5A and 5B illustrate an example of a feedback configuration that supports dynamic configuration of PSFCH format in accordance with aspects of the present disclosure.

Turning first to feedback configuration 500-*a* of FIG. 5A, the SCI-3 message format may be similar to a PUCCH-2 format, and may correspond to the feedback resource 515 portions of PSSCH 510. For example, the SCI-3 message may be relatively short in the time domain (e.g., 1-2 symbols), but may be wide in frequency (e.g., may span multiple resource blocks, subchannels, etc.). In the non-limiting example illustrated in FIG. 5A, the feedback resources 515 for the SCI-3 message) may span two symbols (e.g., symbols 3 and 4) of the slot and may span the full frequency band.

In some aspects, the SCI-3 message may use one symbol and up to X subchannels (e.g., if the PSSCH 510 subchannels have a larger threshold). In some example, the SCI-3 message may use two symbols and up to X resource blocks with intra-slot hopping (e.g., if the PSSCH 510 subchannels have a larger threshold). In some examples, the SCI-3 message may use two symbols and up to X resource blocks (e.g., if the PSSCH 510 has a lower threshold). For example, the SCI-3 message may use the exact configuration (e.g., the second resource configuration) indicated by SCI-2 or upper layer signaling.

Figure 5B:
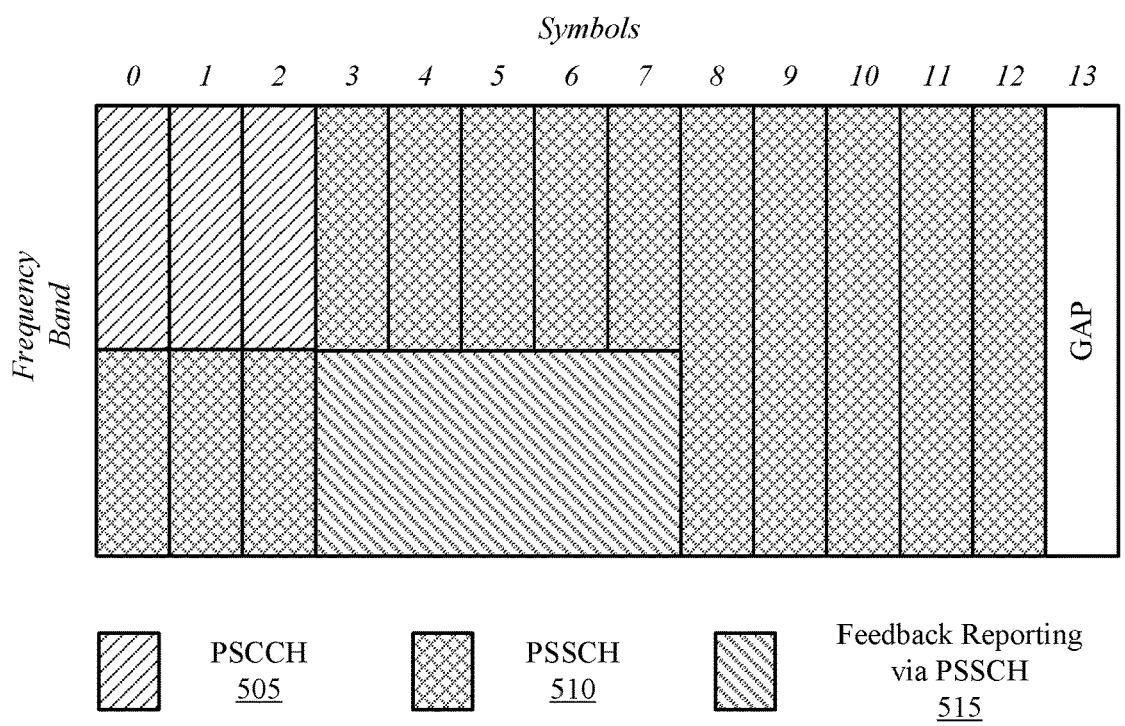

Turning to feedback configuration 500-*b* of FIG. 5B, in some examples the SCI-3 message may use a PUCCH-3 format for feedback message reporting by the receiving device. This format may correspond to additional resource in the time domain, which may span one or more resource blocks. In the non-limiting example illustrated in FIG. 5B, this may include the second resource configuration spanning a subset of the frequency band (e.g., the lowest X subchannels) and spanning symbols 3-7 (e.g., longer in the time domain). The configuration for SCI-3 may be as configured by SCI-2, upper layer signaling, and the like. In some examples, this format may enable intra-slot frequency hopping.

Figure 6:
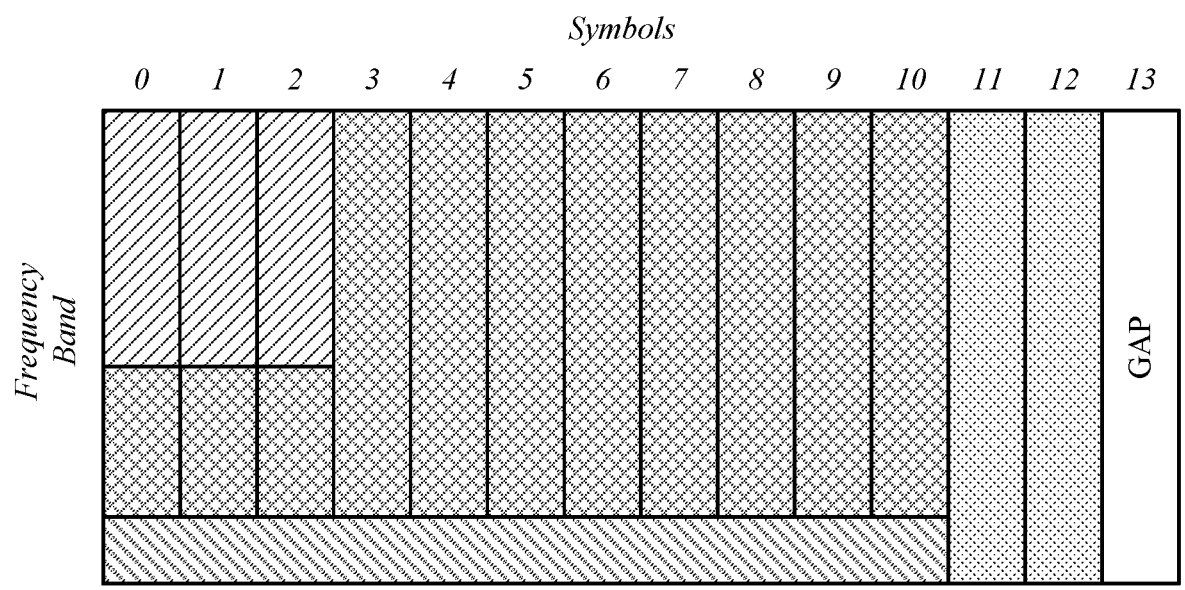
FIG. 6 illustrates an example of a feedback configuration that supports dynamic configuration of PSFCH format in accordance with aspects of the present disclosure.

FIG. 6 illustrates an example of a feedback configuration 600 that supports dynamic configuration of PSFCH format in accordance with aspects of the present disclosure. Feedback configuration 600 may implement aspects of wireless communications systems 100 and/or 200 and/or feedback configuration 300, 400, and/or 500. Aspects of feedback configuration 600 may be implemented by or implemented at a UE, which may be an example of the corresponding device described herein.

As discussed above, aspects of the described techniques provide for a transmitting device performing a sidelink transmission to a receiving device to dynamically configure a second resource configuration for the receiving device to transmit a feedback message. For example, the transmitting device and receiving device may identify or otherwise determine that a sidelink transmission is to be performed from the transmitting device to the receiving device. For example, this may be based on identifying, selecting, receiving, etc., data/information for transmission to the receiving device. In some aspects, this may be in response to a request from the receiving device for the sidelink transmission. Broadly, the sidelink transmission may include a sidelink control channel (e.g., PSCCH 605) carrying SCI-1 and a sidelink data channel (e.g., PSSCH 610) carrying SCI-2 and the sidelink data/information being transmitted.

The transmitting device may identify or otherwise determine that a first resource configuration (e.g., legacy PSFCH resources configured for the last two symbols of a slot) fails to satisfy a resource threshold for transmitting the feedback message. For example, the transmitting device may identify or otherwise determine that the first resource configuration does not contain or otherwise allocate sufficient resources for the feedback message transmission to satisfy a reliability requirement, a latency requirement, a QoS requirement, and the like, for the feedback message. Accordingly, the transmitting device may transmit an indication of a second resource configuration to the receiving device. The transmitting device may transmit an explicit indication of the resources in the second resource configuration and/or may transmit an X1 scaler to be used by the receiving device to identify the resources of the second resource configuration. The second resource configuration may be for the receiving device to transmit the feedback message to the transmitting device. Broadly, the second resource configuration may include additional resources (e.g., more resources) than the first resource configuration in order to satisfy the resource threshold. The transmitting device may transmit the indication of the second resource configuration in SCI-1, SCI-2, upper layer signaling (e.g., L3 signaling), and/or using a new format SCI-3 message carried in PSSCH. Accordingly, the transmitting device may transmit the sidelink transmission to the receiving device, which respond by transmitting the feedback message using the second resource configuration.

In some examples, the second resource configuration may be resources of the sidelink data channel (e.g., feedback resources 620 of PSSCH 610 allocated for feedback reporting via PSSCH). Accordingly, the receiving device may use feedback resources 620 of PSSCH 610 for HARQ-ACK feedback reporting to the transmitting device for the sidelink transmission.

Feedback configuration 600 illustrate an example where the second resource configuration uses a slot with the legacy PSFCH allocations (e.g., PSFCH 615 of the first resource configuration spanning the last two symbols of the slot prior to the gap symbol). That is, the second resource configuration is for a slot of the sidelink feedback channel (e.g., such as a slot having PSCCH 605, PSSCH 610, and PSFCH 615). In some aspects, this may include the receiving device identify the last two symbols of the slot (e.g., symbols 11-12) that include the sidelink feedback channel (e.g., PSFCH 615). According to the second resource configuration, the receiving device may select an additional set of symbols of the slot for the second resource configuration (e.g., symbols 0-10). That is, the transmitting device and/or receiving device may avoid using the PSFCH 615 resources for HARQ feedback, but may instead use the PSSCH 610 resources allocated in the second resource configuration to HARQ feedback (e.g., to transmit the feedback message).

In some aspects, the transmitting device and/or receiving device may ignore a gap symbol before PSFCH 615 and, instead, use this symbol for PSSCH transmissions (e.g., feedback message transmissions and/or sidelink data/information transmissions). That is, the transmitting device and/or receiving device may identify the last three symbols of the slot including PSFCH 615 and a gap period (e.g., the legacy first resource configuration typically includes a gap period between PSSCH and PSFCH resources to allow for transmit-to-receive transitions). The receiving device may receive the sidelink transmission via PSSCH 610 during symbol(s) of those last three symbols instead. That is, the transmitting device may not expect to receive HARQ reporting via PSFCH 615 (e.g., via the first resource configuration), and therefore the gap period may be unnecessary for transmit-to-receive switching. Instead, HARQ reporting (e.g., the feedback message) may be transmitted in feedback resources 620 of PSSCH 610. In this situation, neither the transmitting device or the receiving device may need to monitor PSFCH 615 resources.

In some aspects, the transmitting device and/or receiving device may also ignore the gap symbol before PSFCH 615 and use the resource blocks of PSFCH 615. In this situation, HARQ feedback reporting (e.g., the feedback message) may be transmitted using the feedback resources 620 as well as the resource block in PSFCH 615. That is, the transmitting device and/or receiving device may identify the last three symbols of the slot (e.g., those typically scheduled for the gap symbol and the last two symbols of the first resource configuration of PSFCH 615). The receiving device may transmit the feedback message during those last three symbol(s) the PSFCH 615, as well as symbol(s) of the feedback resources 620 of PSSCH 6610.

Figure 7:
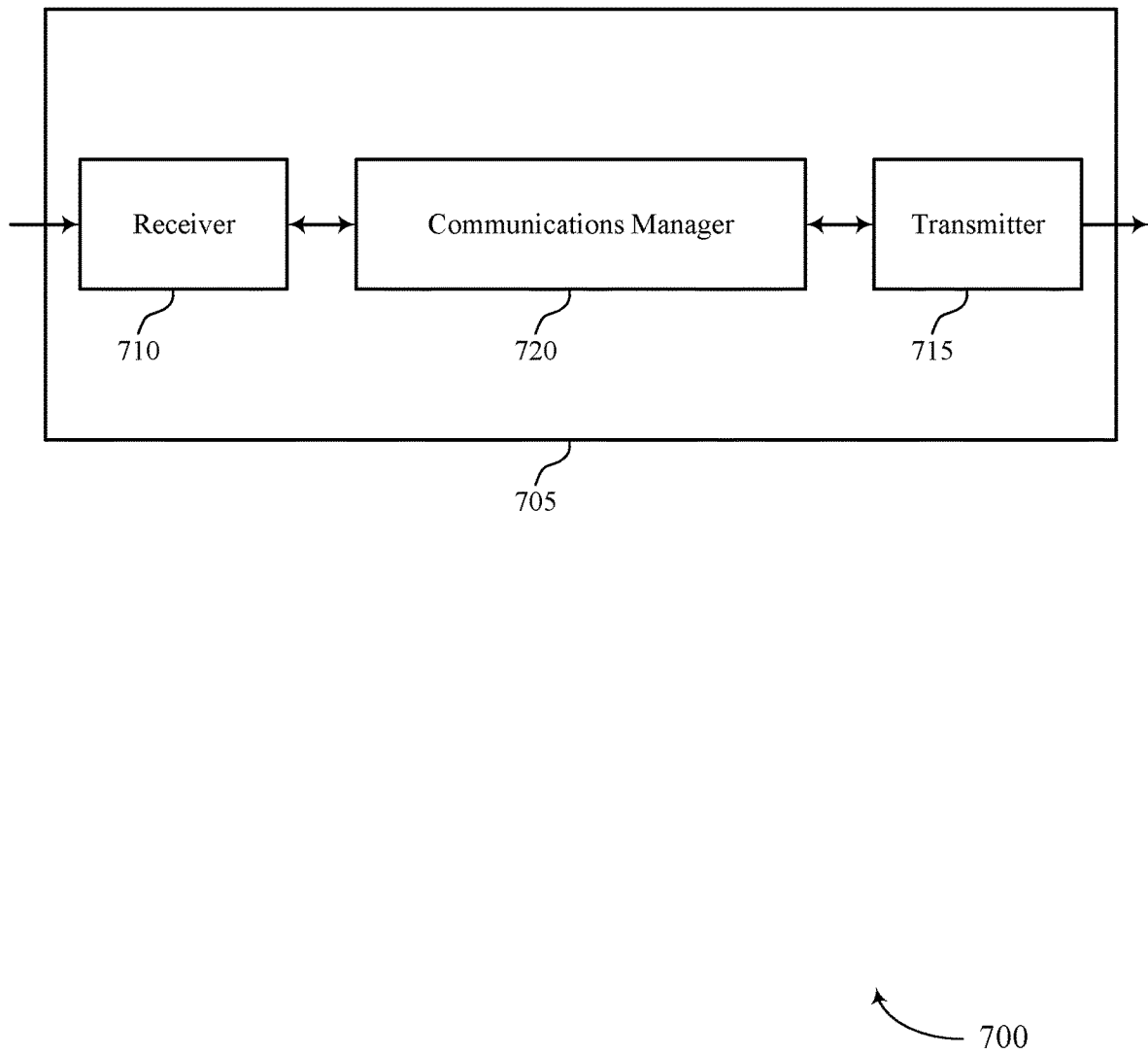
FIGS. 7 and 8 show block diagrams of devices that support dynamic configuration of PSFCH format in accordance with aspects of the present disclosure.

FIG. 7 shows a block diagram 700 of a device 705 that supports dynamic configuration of PSFCH format in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic configuration of PSFCH format). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic configuration of PSFCH format). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of dynamic configuration of PSFCH format as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. For example, the communications manager 720 may be configured as or otherwise support a means for determining that the first UE is to receive a sidelink transmission from a second UE, the sidelink transmission including a sidelink control channel and a sidelink data channel. The communications manager 720 may be configured as or otherwise support a means for receiving, based on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold. The communications manager 720 may be configured as or otherwise support a means for receiving the sidelink transmission from the second UE. The communications manager 720 may be configured as or otherwise support a means for transmitting, to the second UE, the feedback message using the second resource configuration.

Additionally, or alternatively, the communications manager 720 may support wireless communication at a first UE in accordance with examples as disclosed herein. For example, the communications manager 720 may be configured as or otherwise support a means for determining that the first UE is to transmit a sidelink transmission to a second UE, the sidelink transmission including a sidelink control channel and a sidelink data channel. The communications manager 720 may be configured as or otherwise support a means for transmitting, based on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold. The communications manager 720 may be configured as or otherwise support a means for transmitting the sidelink transmission to the second UE. The communications manager 720 may be configured as or otherwise support a means for receiving, from the second UE, a feedback message using the second resource configuration.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for improving PSFCH utilization, improving HARQ feedback signaling resources, enable improved reliability for sidelink transmissions, and the like.

Figure 8:
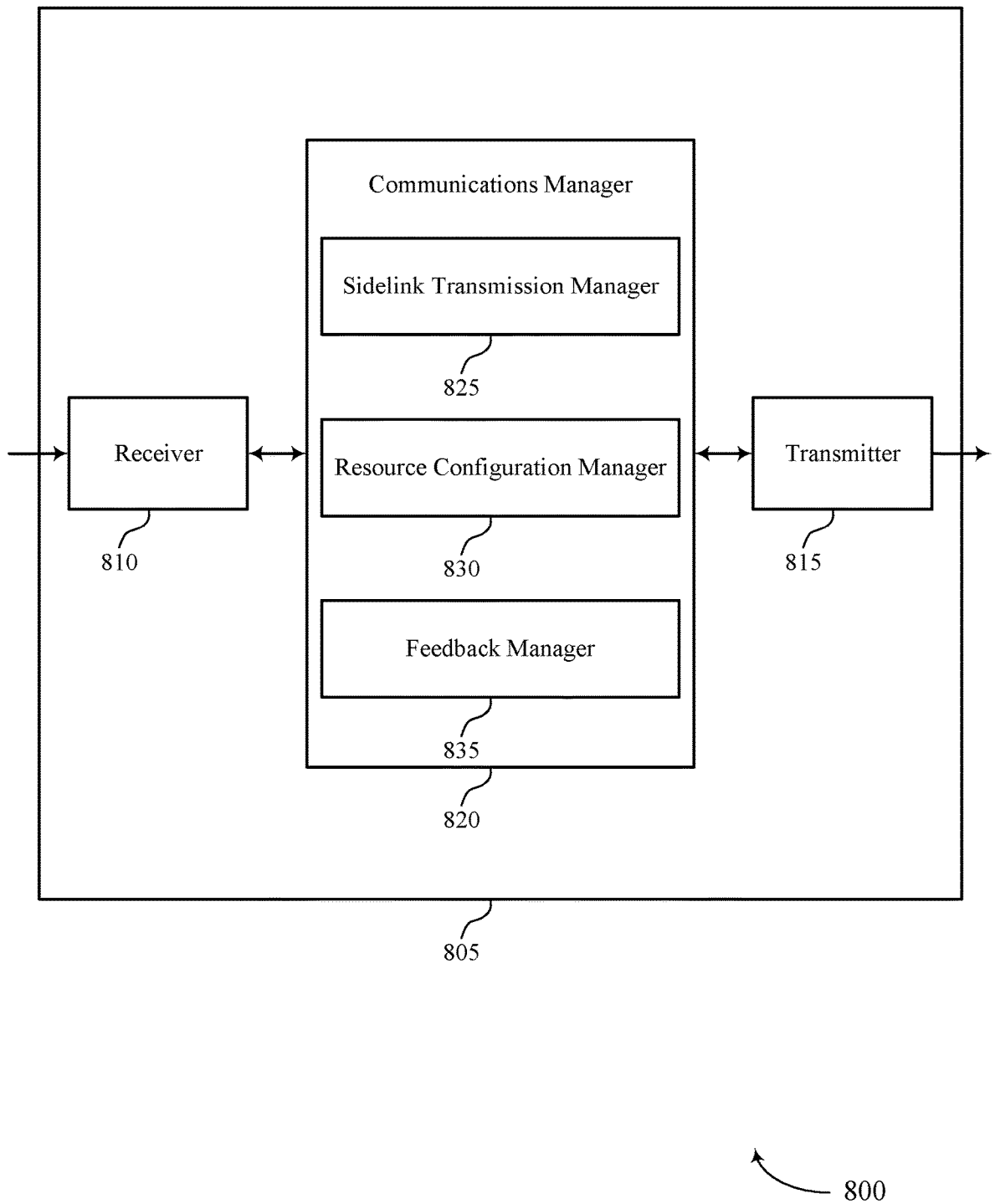

FIG. 8 shows a block diagram 800 of a device 805 that supports dynamic configuration of PSFCH format in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to dynamic configuration of PSFCH format). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to dynamic configuration of PSFCH format). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of dynamic configuration of PSFCH format as described herein. For example, the communications manager 820 may include a sidelink transmission manager 825, a resource configuration manager 830, a feedback manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. The sidelink transmission manager 825 may be configured as or otherwise support a means for determining that the first UE is to receive a sidelink transmission from a second UE, the sidelink transmission including a sidelink control channel and a sidelink data channel. The resource configuration manager 830 may be configured as or otherwise support a means for receiving, based on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold. The sidelink transmission manager 825 may be configured as or otherwise support a means for receiving the sidelink transmission from the second UE. The feedback manager 835 may be configured as or otherwise support a means for transmitting, to the second UE, the feedback message using the second resource configuration.

Additionally, or alternatively, the communications manager 820 may support wireless communication at a first UE in accordance with examples as disclosed herein. The sidelink transmission manager 825 may be configured as or otherwise support a means for determining that the first UE is to transmit a sidelink transmission to a second UE, the sidelink transmission including a sidelink control channel and a sidelink data channel. The resource configuration manager 830 may be configured as or otherwise support a means for transmitting, based on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold. The sidelink transmission manager 825 may be configured as or otherwise support a means for transmitting the sidelink transmission to the second UE. The feedback manager 835 may be configured as or otherwise support a means for receiving, from the second UE, a feedback message using the second resource configuration.

Figure 9:
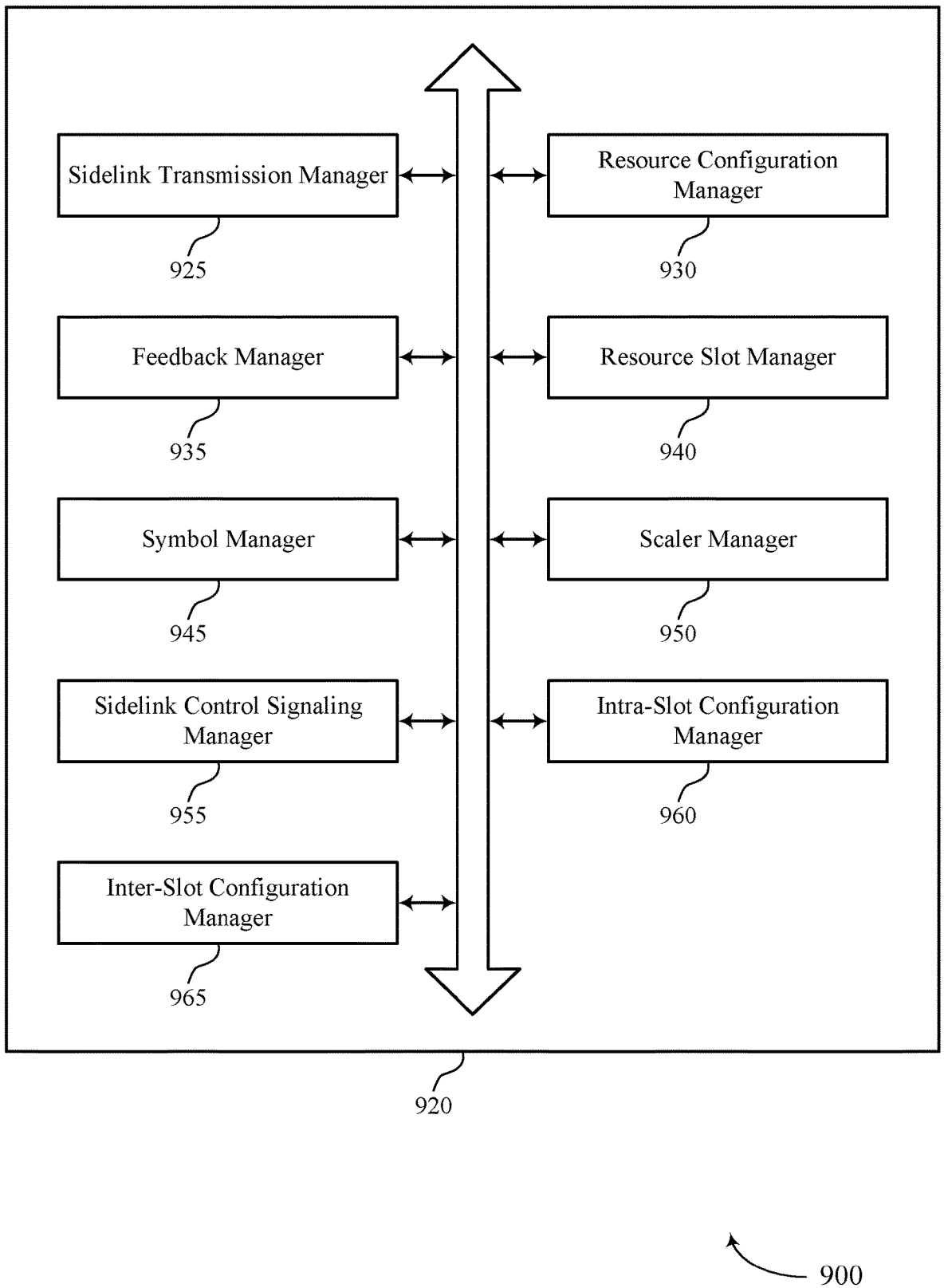
FIG. 9 shows a block diagram of a communications manager that supports dynamic configuration of PSFCH format in accordance with aspects of the present disclosure.

FIG. 9 shows a block diagram 900 of a communications manager 920 that supports dynamic configuration of PSFCH format in accordance with aspects of the present disclosure. The communications manager 920 may be an example of aspects of a communications manager 720, a communications manager 820, or both, as described herein. The communications manager 920, or various components thereof, may be an example of means for performing various aspects of dynamic configuration of PSFCH format as described herein. For example, the communications manager 920 may include a sidelink transmission manager 925, a resource configuration manager 930, a feedback manager 935, a resource slot manager 940, a symbol manager 945, a scaler manager 950, a sidelink control signaling manager 955, an intra-slot configuration manager 960, an inter-slot configuration manager 965, or any combination thereof. Each of these components may communicate, directly or indirectly, with one another (e.g., via one or more buses).

The communications manager 920 may support wireless communication at a first UE in accordance with examples as disclosed herein. The sidelink transmission manager 925 may be configured as or otherwise support a means for determining that the first UE is to receive a sidelink transmission from a second UE, the sidelink transmission including a sidelink control channel and a sidelink data channel. The resource configuration manager 930 may be configured as or otherwise support a means for receiving, based on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold. In some examples, the sidelink transmission manager 925 may be configured as or otherwise support a means for receiving the sidelink transmission from the second UE. The feedback manager 935 may be configured as or otherwise support a means for transmitting, to the second UE, the feedback message using the second resource configuration.

In some examples, the resource slot manager 940 may be configured as or otherwise support a means for selecting, based on the first resource configuration failing to satisfy the resource threshold, a second slot to transmit the feedback message, the second slot being a different slot than the first slot.

In some examples, the symbol manager 945 may be configured as or otherwise support a means for selecting, based on the first resource configuration failing to satisfy the resource threshold, a set of additional symbols of the slot for the second resource configuration, the set of additional symbols being different symbols than the two symbols allocated to the first resource configuration.

In some examples, the symbol manager 945 may be configured as or otherwise support a means for transmitting the feedback message over the set of additional symbols or multiplexed over the set of additional symbols and the two symbols.

In some examples, to support receiving the indication, the scaler manager 950 may be configured as or otherwise support a means for receiving a scaler that allocates a first set of symbols to the sidelink data channel and a second set of symbols to the sidelink feedback channel for the feedback message. In some examples, the scaler manager 950 may be configured as or otherwise support a means for receiving the indication of the scaler in a SCI message. In some examples, the SCI message includes one or more bits configured to explicitly indicate the scaler, one or more parameters set to values to implicitly indicate the scaler, or both. In some examples, the scaler manager 950 may be configured as or otherwise support a means for receiving the indication of the scaler in a layer three message via the sidelink data channel.

In some examples, the sidelink control signaling manager 955 may be configured as or otherwise support a means for transmitting sidelink control signaling using the second resource configuration, the sidelink control signaling being different from the feedback message. In some examples, the second resource configuration is for a slot of the sidelink data channel.

In some examples, the intra-slot configuration manager 960 may be configured as or otherwise support a means for transmitting the feedback message during a last two symbols of the slot for the sidelink data channel using a HARQ-ACK format message associated with a physical uplink control channel. In some examples, the intra-slot configuration manager 960 may be configured as or otherwise support a means for multiplexing the feedback message with sidelink data to obtain a multiplexed message. In some examples, the intra-slot configuration manager 960 may be configured as or otherwise support a means for transmitting the multiplexed message during the slot of the sidelink data channel.

In some examples, the intra-slot configuration manager 960 may be configured as or otherwise support a means for transmitting the feedback message, sidelink control signaling, or both, in a SCI two format message via the sidelink data channel. In some examples, the intra-slot configuration manager 960 may be configured as or otherwise support a means for transmitting the feedback message in a SCI three message via the sidelink data channel. In some examples, the intra-slot configuration manager 960 may be configured as or otherwise support a means for receiving, in the sidelink transmission via the sidelink data channel, a third resource configuration for the SCI three message. In some examples, the SCI three message includes a HARQ-ACK format message associated with a PUCCH. In some examples, the second resource configuration is for a slot including the sidelink feedback channel.

In some examples, the inter-slot configuration manager 965 may be configured as or otherwise support a means for identifying, based on the first resource configuration, a last two symbols of the slot including the sidelink feedback channel. In some examples, the inter-slot configuration manager 965 may be configured as or otherwise support a means for selecting an additional set of symbols of the slot for the second resource configuration.

In some examples, the inter-slot configuration manager 965 may be configured as or otherwise support a means for identifying, based on the first resource configuration, a last three symbols of the slot including the sidelink feedback channel and a gap period occurring prior to the sidelink feedback channel. In some examples, the inter-slot configuration manager 965 may be configured as or otherwise support a means for receiving, based on the second resource configuration, the sidelink transmission via the sidelink data channel during one or more symbols of the last three symbols of the slot.

In some examples, the inter-slot configuration manager 965 may be configured as or otherwise support a means for identifying, based on the first resource configuration, a last three symbols of the slot including the sidelink feedback channel and a gap period occurring prior to the sidelink feedback channel. In some examples, the inter-slot configuration manager 965 may be configured as or otherwise support a means for transmitting, based on the second resource configuration, the feedback message via the sidelink feedback channel during one or more symbols of the last three symbols of the slot.

Additionally, or alternatively, the communications manager 920 may support wireless communication at a first UE in accordance with examples as disclosed herein. In some examples, the sidelink transmission manager 925 may be configured as or otherwise support a means for determining that the first UE is to transmit a sidelink transmission to a second UE, the sidelink transmission including a sidelink control channel and a sidelink data channel. In some examples, the resource configuration manager 930 may be configured as or otherwise support a means for transmitting, based on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold. In some examples, the sidelink transmission manager 925 may be configured as or otherwise support a means for transmitting the sidelink transmission to the second UE. In some examples, the feedback manager 935 may be configured as or otherwise support a means for receiving, from the second UE, a feedback message using the second resource configuration.

In some examples, the resource slot manager 940 may be configured as or otherwise support a means for selecting, based on the first resource configuration failing to satisfy the resource threshold, a second slot to transmit the feedback message, the second slot being a different slot than the first slot.

In some examples, the symbol manager 945 may be configured as or otherwise support a means for selecting, based on the first resource configuration failing to satisfy the resource threshold, a set of additional symbols of the slot for the second resource configuration, the set of additional symbols being different symbols than the two symbols allocated to the first resource configuration. In some examples, the symbol manager 945 may be configured as or otherwise support a means for transmitting the feedback message over the set of additional symbols or multiplexed over the set of additional symbols and the two symbols.

In some examples, to support transmitting the indication, the scaler manager 950 may be configured as or otherwise support a means for transmitting a scaler that allocates a first set of symbols to the sidelink data channel and a second set of symbols to the sidelink feedback channel for the feedback message. In some examples, the scaler manager 950 may be configured as or otherwise support a means for transmitting the indication of the scaler in a SCI message. In some examples, the SCI message includes one or more bits configured to explicitly indicate the scaler, one or more parameters set to values to implicitly indicate the scaler, or both. In some examples, the scaler manager 950 may be configured as or otherwise support a means for transmitting the indication of the scaler in a layer three message via the sidelink data channel.

In some examples, the sidelink control signaling manager 955 may be configured as or otherwise support a means for receiving sidelink control signaling using the second resource configuration, the sidelink control signaling being different from the feedback message. In some examples, the second resource configuration is for a slot of the sidelink data channel.

In some examples, the intra-slot configuration manager 960 may be configured as or otherwise support a means for receiving the feedback message during a last two symbols of the slot for the sidelink data channel using a HARQ-ACK format message associated with a physical uplink control channel. In some examples, the intra-slot configuration manager 960 may be configured as or otherwise support a means for receiving a multiplexed message during the slot of the sidelink data channel, the multiplexed message obtained by the second UE multiplexing the feedback message with sidelink data.

In some examples, the intra-slot configuration manager 960 may be configured as or otherwise support a means for receiving the feedback message, sidelink control signaling, or both, in a SCI two format message via the sidelink data channel. In some examples, the intra-slot configuration manager 960 may be configured as or otherwise support a means for receiving the feedback message in a SCI three message via the sidelink data channel. In some examples, the intra-slot configuration manager 960 may be configured as or otherwise support a means for transmitting, in the sidelink transmission via the sidelink data channel, a third resource configuration for the sidelink control three message. In some examples, the SCI three message includes a HARQ-ACK format message associated with a PUCCH. In some examples, the second resource configuration is for a slot including the sidelink feedback channel.

In some examples, the inter-slot configuration manager 965 may be configured as or otherwise support a means for identifying, based on the first resource configuration, a last two symbols of the slot including the sidelink feedback channel. In some examples, the inter-slot configuration manager 965 may be configured as or otherwise support a means for selecting an additional set of symbols of the slot for the second resource configuration. In some examples, the inter-slot configuration manager 965 may be configured as or otherwise support a means for identifying, based on the first resource configuration, a last three symbols of the slot including the sidelink feedback channel and a gap period occurring prior to the sidelink feedback channel. In some examples, the inter-slot configuration manager 965 may be configured as or otherwise support a means for transmitting, based on the second resource configuration, the sidelink transmission via the sidelink data channel during one or more symbols of the last three symbols of the slot.

In some examples, the inter-slot configuration manager 965 may be configured as or otherwise support a means for identifying, based on the first resource configuration, a last three symbols of the slot including the sidelink feedback channel and a gap period occurring prior to the sidelink feedback channel. In some examples, the inter-slot configuration manager 965 may be configured as or otherwise support a means for receiving, based on the second resource configuration, the feedback message via the sidelink feedback channel during one or more symbols of the last three symbols of the slot.

Figure 10:
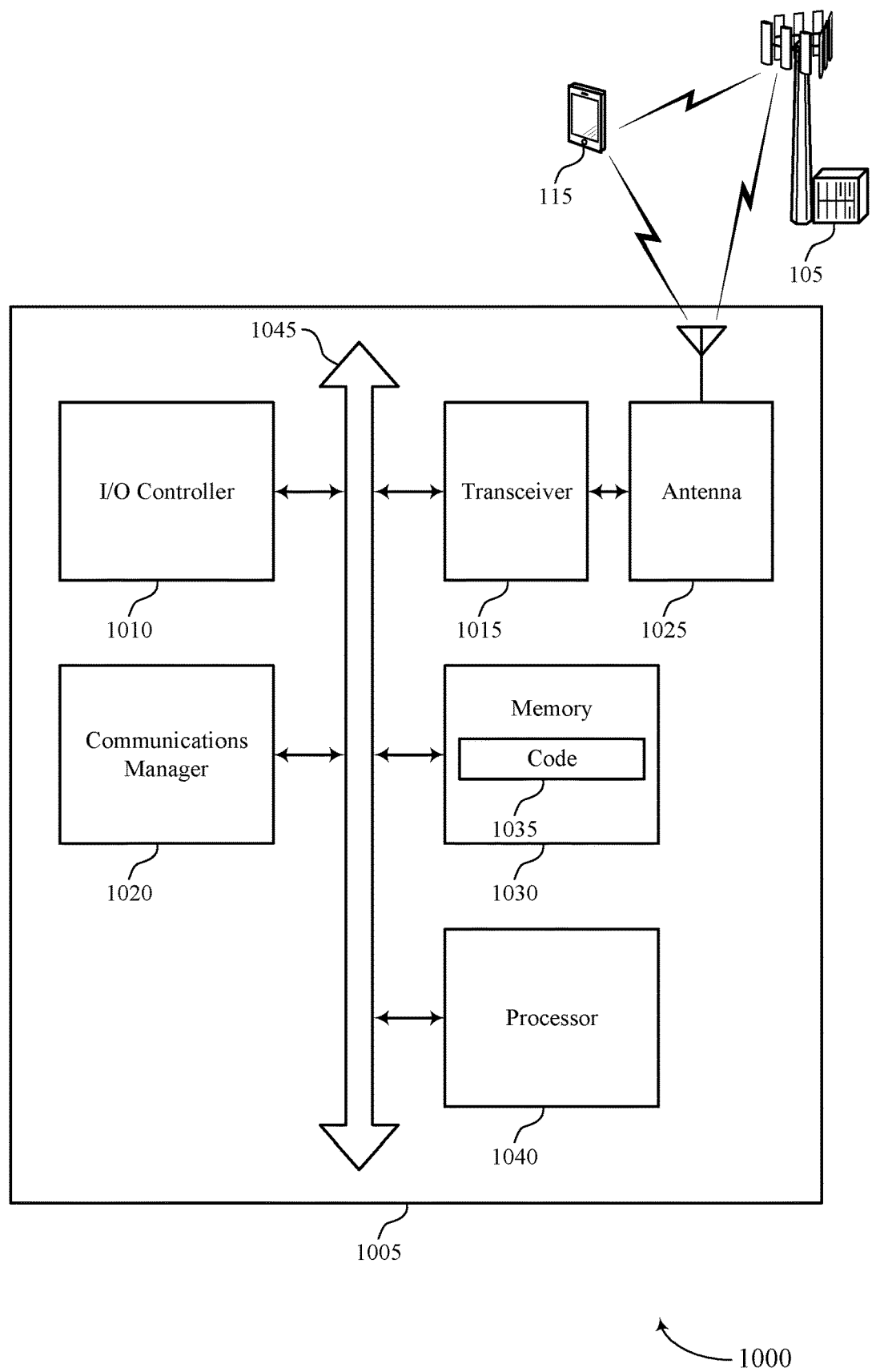
FIG. 10 shows a diagram of a system including a device that supports dynamic configuration of PSFCH format in accordance with aspects of the present disclosure.

FIG. 10 shows a diagram of a system 1000 including a device 1005 that supports dynamic configuration of PSFCH format in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting dynamic configuration of PSFCH format). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for determining that the first UE is to receive a sidelink transmission from a second UE, the sidelink transmission including a sidelink control channel and a sidelink data channel. The communications manager 1020 may be configured as or otherwise support a means for receiving, based on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold. The communications manager 1020 may be configured as or otherwise support a means for receiving the sidelink transmission from the second UE. The communications manager 1020 may be configured as or otherwise support a means for transmitting, to the second UE, the feedback message using the second resource configuration.

Additionally, or alternatively, the communications manager 1020 may support wireless communication at a first UE in accordance with examples as disclosed herein. For example, the communications manager 1020 may be configured as or otherwise support a means for determining that the first UE is to transmit a sidelink transmission to a second UE, the sidelink transmission including a sidelink control channel and a sidelink data channel. The communications manager 1020 may be configured as or otherwise support a means for transmitting, based on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold. The communications manager 1020 may be configured as or otherwise support a means for transmitting the sidelink transmission to the second UE. The communications manager 1020 may be configured as or otherwise support a means for receiving, from the second UE, a feedback message using the second resource configuration.

By including or configuring the communications manager 1020 in accordance with examples as described herein, the device 1005 may support techniques for improving PSFCH utilization, improving HARQ feedback signaling resources, enable improved reliability for sidelink transmissions, and the like.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of dynamic configuration of PSFCH format as described herein, or the processor 1040 and the memory 1030 may be otherwise configured to perform or support such operations.

Figure 11:
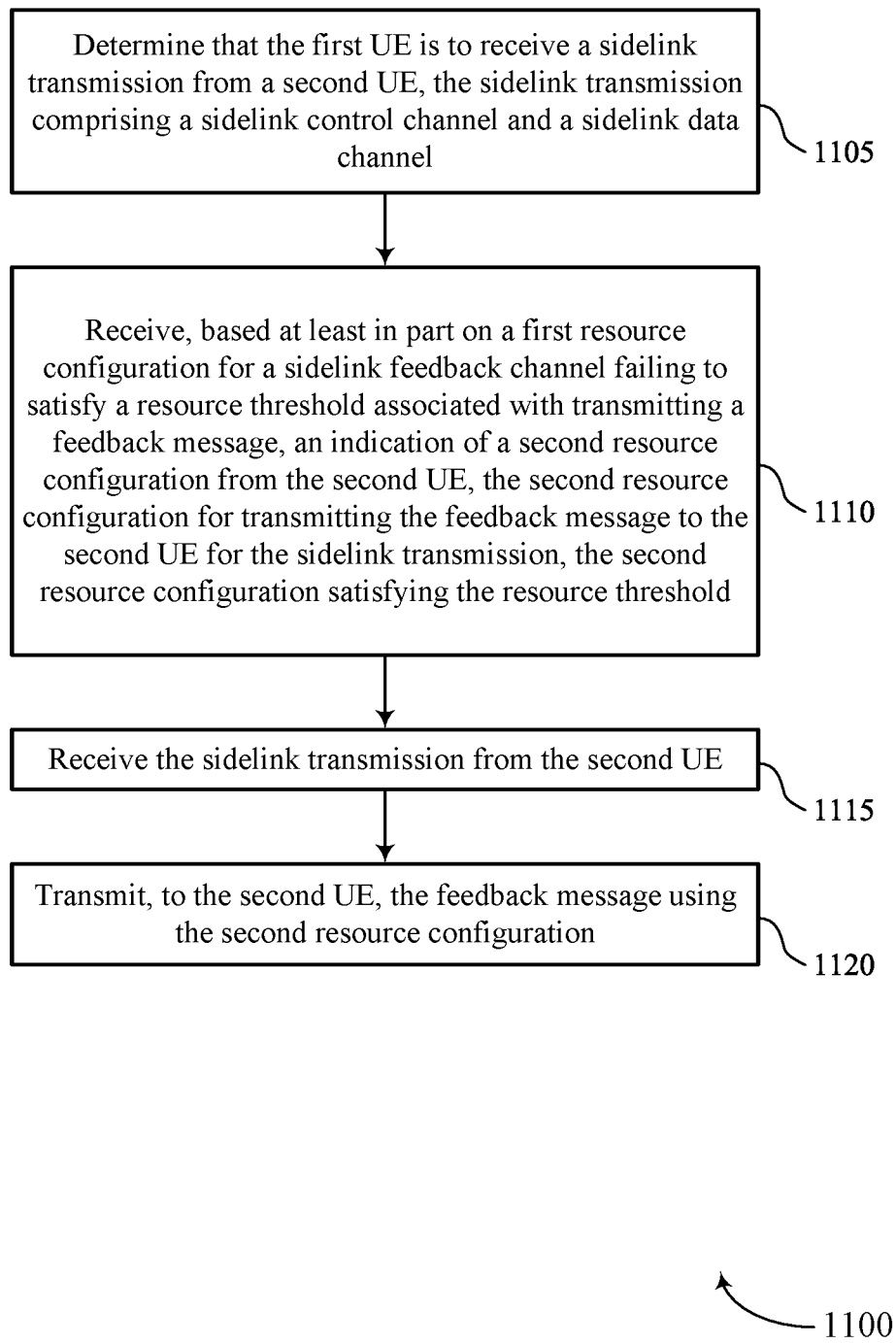
FIGS. 11 through 15 show flowcharts illustrating methods that support dynamic configuration of PSFCH format in accordance with aspects of the present disclosure.

FIG. 11 shows a flowchart illustrating a method 1100 that supports dynamic configuration of PSFCH format in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include determining that the first UE is to receive a sidelink transmission from a second UE, the sidelink transmission including a sidelink control channel and a sidelink data channel. The operations of 1105 may be performed in accordance with examples as disclosed herein. In some examples, aspects of the operations of 1105 may be performed by a sidelink transmission manager 925 as described with reference to FIG. 9.

At 1110, the method may include receiving, based on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold. The operations of 1110 may be performed in accordance with examples as disclosed herein. In some examples, aspects of the operations of 1110 may be performed by a resource configuration manager 930 as described with reference to FIG. 9.

At 1115, the method may include receiving the sidelink transmission from the second UE. The operations of 1115 may be performed in accordance with examples as disclosed herein. In some examples, aspects of the operations of 1115 may be performed by a sidelink transmission manager 925 as described with reference to FIG. 9.

At 1120, the method may include transmitting, to the second UE, the feedback message using the second resource configuration. The operations of 1120 may be performed in accordance with examples as disclosed herein. In some examples, aspects of the operations of 1120 may be performed by a feedback manager 935 as described with reference to FIG. 9.

Figure 12:
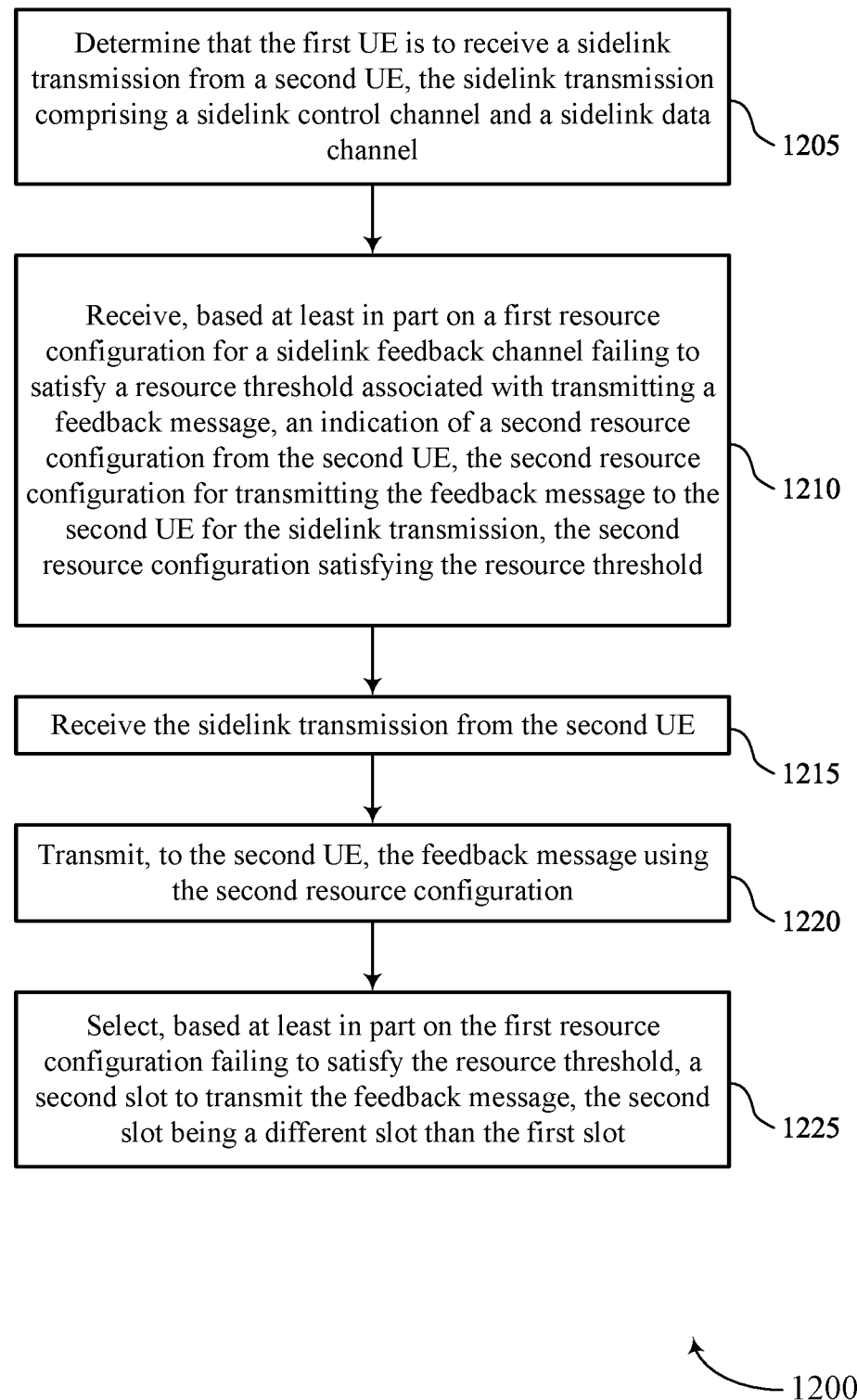

FIG. 12 shows a flowchart illustrating a method 1200 that supports dynamic configuration of PSFCH format in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include determining that the first UE is to receive a sidelink transmission from a second UE, the sidelink transmission including a sidelink control channel and a sidelink data channel. The operations of 1205 may be performed in accordance with examples as disclosed herein. In some examples, aspects of the operations of 1205 may be performed by a sidelink transmission manager 925 as described with reference to FIG. 9.

At 1210, the method may include receiving, based on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold. The operations of 1210 may be performed in accordance with examples as disclosed herein. In some examples, aspects of the operations of 1210 may be performed by a resource configuration manager 930 as described with reference to FIG. 9.

At 1215, the method may include receiving the sidelink transmission from the second UE. The operations of 1215 may be performed in accordance with examples as disclosed herein. In some examples, aspects of the operations of 1215 may be performed by a sidelink transmission manager 925 as described with reference to FIG. 9.

At 1220, the method may include transmitting, to the second UE, the feedback message using the second resource configuration. The operations of 1220 may be performed in accordance with examples as disclosed herein. In some examples, aspects of the operations of 1220 may be performed by a feedback manager 935 as described with reference to FIG. 9.

At 1225, the method may include selecting, based on the first resource configuration failing to satisfy the resource threshold, a second slot to transmit the feedback message, the second slot being a different slot than the first slot. The operations of 1225 may be performed in accordance with examples as disclosed herein. In some examples, aspects of the operations of 1225 may be performed by a resource slot manager 940 as described with reference to FIG. 9.

Figure 13:
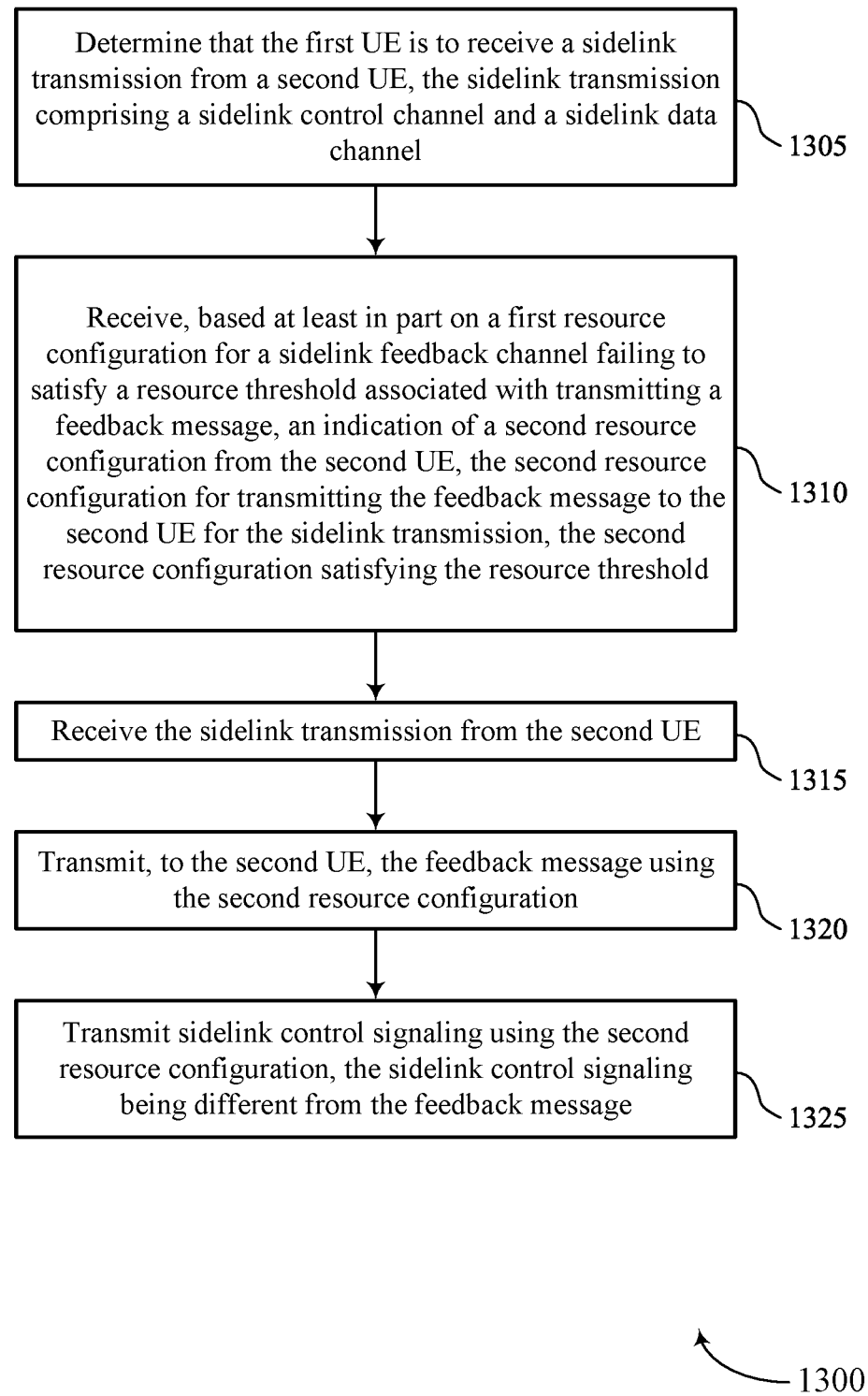

FIG. 13 shows a flowchart illustrating a method 1300 that supports dynamic configuration of PSFCH format in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include determining that the first UE is to receive a sidelink transmission from a second UE, the sidelink transmission including a sidelink control channel and a sidelink data channel. The operations of 1305 may be performed in accordance with examples as disclosed herein. In some examples, aspects of the operations of 1305 may be performed by a sidelink transmission manager 925 as described with reference to FIG. 9.

At 1310, the method may include receiving, based on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold. The operations of 1310 may be performed in accordance with examples as disclosed herein. In some examples, aspects of the operations of 1310 may be performed by a resource configuration manager 930 as described with reference to FIG. 9.

At 1315, the method may include receiving the sidelink transmission from the second UE. The operations of 1315 may be performed in accordance with examples as disclosed herein. In some examples, aspects of the operations of 1315 may be performed by a sidelink transmission manager 925 as described with reference to FIG. 9.

At 1320, the method may include transmitting, to the second UE, the feedback message using the second resource configuration. The operations of 1320 may be performed in accordance with examples as disclosed herein. In some examples, aspects of the operations of 1320 may be performed by a feedback manager 935 as described with reference to FIG. 9.

At 1325, the method may include transmitting sidelink control signaling using the second resource configuration, the sidelink control signaling being different from the feedback message. The operations of 1325 may be performed in accordance with examples as disclosed herein. In some examples, aspects of the operations of 1325 may be performed by a sidelink control signaling manager 955 as described with reference to FIG. 9.

Figure 14:
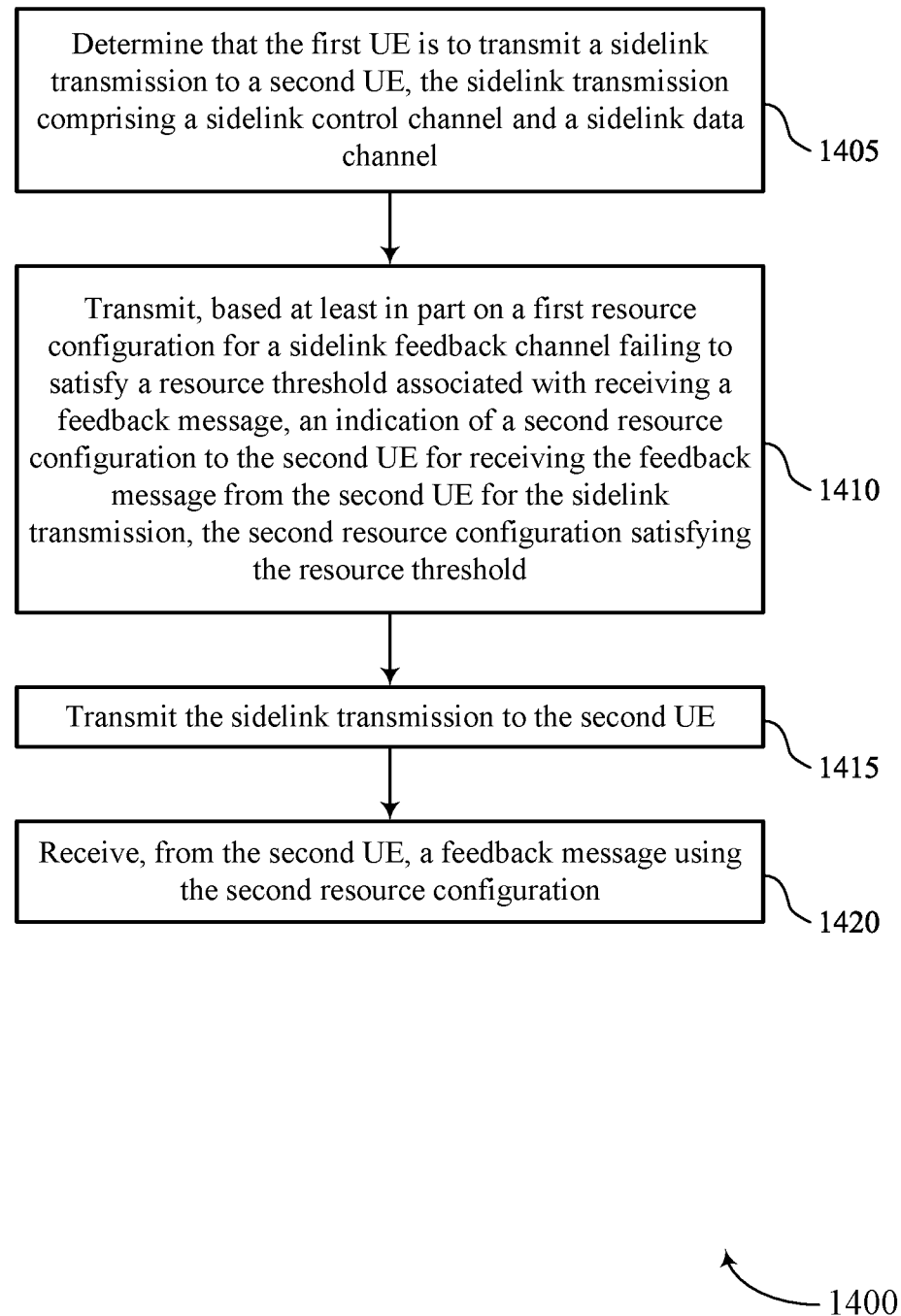

FIG. 14 shows a flowchart illustrating a method 1400 that supports dynamic configuration of PSFCH format in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, the method may include determining that the first UE is to transmit a sidelink transmission to a second UE, the sidelink transmission including a sidelink control channel and a sidelink data channel. The operations of 1405 may be performed in accordance with examples as disclosed herein. In some examples, aspects of the operations of 1405 may be performed by a sidelink transmission manager 925 as described with reference to FIG. 9.

At 1410, the method may include transmitting, based on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold. The operations of 1410 may be performed in accordance with examples as disclosed herein. In some examples, aspects of the operations of 1410 may be performed by a resource configuration manager 930 as described with reference to FIG. 9.

At 1415, the method may include transmitting the sidelink transmission to the second UE. The operations of 1415 may be performed in accordance with examples as disclosed herein. In some examples, aspects of the operations of 1415 may be performed by a sidelink transmission manager 925 as described with reference to FIG. 9.

At 1420, the method may include receiving, from the second UE, a feedback message using the second resource configuration. The operations of 1420 may be performed in accordance with examples as disclosed herein. In some examples, aspects of the operations of 1420 may be performed by a feedback manager 935 as described with reference to FIG. 9.

Figure 15:
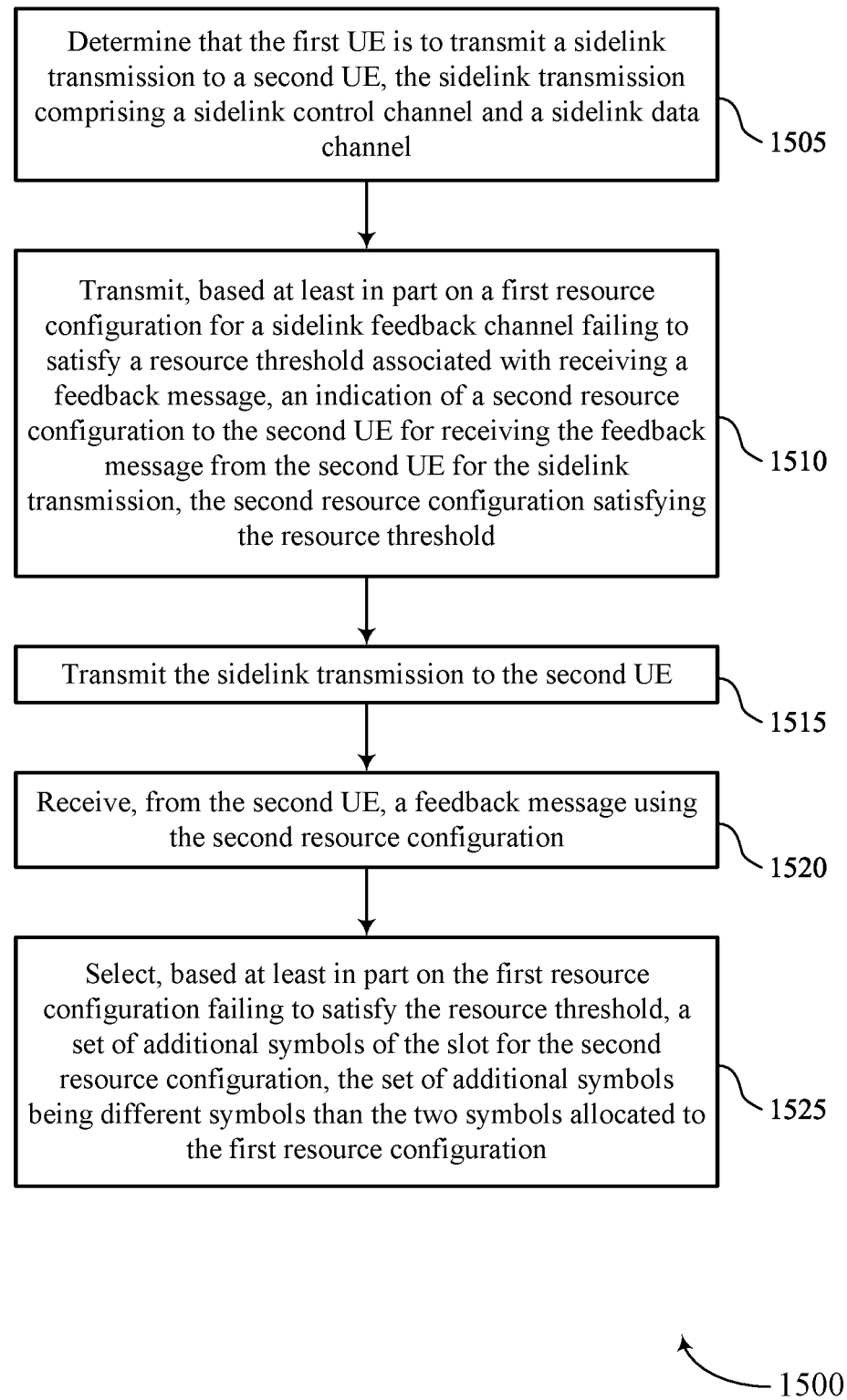

FIG. 15 shows a flowchart illustrating a method 1500 that supports dynamic configuration of PSFCH format in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include determining that the first UE is to transmit a sidelink transmission to a second UE, the sidelink transmission including a sidelink control channel and a sidelink data channel. The operations of 1505 may be performed in accordance with examples as disclosed herein. In some examples, aspects of the operations of 1505 may be performed by a sidelink transmission manager 925 as described with reference to FIG. 9.

At 1510, the method may include transmitting, based on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold. The operations of 1510 may be performed in accordance with examples as disclosed herein. In some examples, aspects of the operations of 1510 may be performed by a resource configuration manager 930 as described with reference to FIG. 9.

At 1515, the method may include transmitting the sidelink transmission to the second UE. The operations of 1515 may be performed in accordance with examples as disclosed herein. In some examples, aspects of the operations of 1515 may be performed by a sidelink transmission manager 925 as described with reference to FIG. 9.

At 1520, the method may include receiving, from the second UE, a feedback message using the second resource configuration. The operations of 1520 may be performed in accordance with examples as disclosed herein. In some examples, aspects of the operations of 1520 may be performed by a feedback manager 935 as described with reference to FIG. 9.

At 1525, the method may include selecting, based on the first resource configuration failing to satisfy the resource threshold, a set of additional symbols of the slot for the second resource configuration, the set of additional symbols being different symbols than the two symbols allocated to the first resource configuration. The operations of 1525 may be performed in accordance with examples as disclosed herein. In some examples, aspects of the operations of 1525 may be performed by a symbol manager 945 as described with reference to FIG. 9.

The following provides an overview of aspects of the present disclosure:

Aspect 1: A method for wireless communication at a first UE, comprising: determining that the first UE is to receive a sidelink transmission from a second UE, the sidelink transmission comprising a sidelink control channel and a sidelink data channel; receiving, based at least in part on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold; receiving the sidelink transmission from the second UE; and transmitting, to the second UE, the feedback message using the second resource configuration.

Aspect 2: The method of aspect 1, wherein the first resource configuration is configured during a first slot, further comprising: selecting, based at least in part on the first resource configuration failing to satisfy the resource threshold, a second slot to transmit the feedback message, the second slot being a different slot than the first slot.

Aspect 3: The method of any of aspects 1 through 2, wherein the first resource configuration is configured during two symbols of a slot, further comprising: selecting, based at least in part on the first resource configuration failing to satisfy the resource threshold, a set of additional symbols of the slot for the second resource configuration, the set of additional symbols being different symbols than the two symbols allocated to the first resource configuration.

Aspect 4: The method of aspect 3, further comprising: transmitting the feedback message over the set of additional symbols or multiplexed over the set of additional symbols and the two symbols.

Aspect 5: The method of any of aspects 1 through 4, wherein receiving the indication comprises: receiving a scaler that allocates a first set of symbols to the sidelink data channel and a second set of symbols to the sidelink feedback channel for the feedback message.

Aspect 6: The method of aspect 5, further comprising: receiving the indication of the scaler in a SCI message.

Aspect 7: The method of aspect 6, wherein the SCI message comprises one or more bits configured to explicitly indicate the scaler, one or more parameters set to values to implicitly indicate the scaler, or both.

Aspect 8: The method of any of aspects 5 through 7, further comprising: receiving the indication of the scaler in a layer three message via the sidelink data channel.

Aspect 9: The method of any of aspects 1 through 8, further comprising: transmitting sidelink control signaling using the second resource configuration, the sidelink control signaling being different from the feedback message.

Aspect 10: The method of any of aspects 1 through 9, wherein the second resource configuration is for a slot of the sidelink data channel.

Aspect 11: The method of aspect 10, further comprising: transmitting the feedback message during a last two symbols of the slot for the sidelink data channel using a HARQ-ACK format message associated with a PUCCH.

Aspect 12: The method of any of aspects 10 through 11, further comprising: multiplexing the feedback message with sidelink data to obtain a multiplexed message; and transmitting the multiplexed message during the slot of the sidelink data channel.

Aspect 13: The method of any of aspects 10 through 12, further comprising: transmitting the feedback message, sidelink control signaling, or both, in a SCI two format message via the sidelink data channel.

Aspect 14: The method of any of aspects 10 through 13, further comprising: transmitting the feedback message in a SCI three message via the sidelink data channel.

Aspect 15: The method of aspect 14, further comprising: receiving, in the sidelink transmission via the sidelink data channel, a third resource configuration for the SCI three message.

Aspect 16: The method of any of aspects 14 through 15, wherein the SCI three message comprises a HARQ-ACK format message associated with a PUCCH.

Aspect 17: The method of any of aspects 1 through 16, wherein the second resource configuration is for a slot comprising the sidelink feedback channel.

Aspect 18: The method of aspect 17, further comprising: identifying, based at least in part on the first resource configuration, a last two symbols of the slot comprising the sidelink feedback channel; and selecting an additional set of symbols of the slot for the second resource configuration.

Aspect 19: The method of any of aspects 17 through 18, further comprising: identifying, based at least in part on the first resource configuration, a last three symbols of the slot comprising the sidelink feedback channel and a gap period occurring prior to the sidelink feedback channel; and receiving, based at least in part on the second resource configuration, the sidelink transmission via the sidelink data channel during one or more symbols of the last three symbols of the slot.

Aspect 20: The method of any of aspects 17 through 19, further comprising: identifying, based at least in part on the first resource configuration, a last three symbols of the slot comprising the sidelink feedback channel and a gap period occurring prior to the sidelink feedback channel; and transmitting, based at least in part on the second resource configuration, the feedback message via the sidelink feedback channel during one or more symbols of the last three symbols of the slot.

Aspect 21: A method for wireless communication at a first UE, comprising: determining that the first UE is to transmit a sidelink transmission to a second UE, the sidelink transmission comprising a sidelink control channel and a sidelink data channel; transmitting, based at least in part on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold; transmitting the sidelink transmission to the second UE; and receiving, from the second UE, a feedback message using the second resource configuration.

Aspect 22: The method of aspect 21, wherein the first resource configuration is configured during a first slot, further comprising: selecting, based at least in part on the first resource configuration failing to satisfy the resource threshold, a second slot to transmit the feedback message, the second slot being a different slot than the first slot.

Aspect 23: The method of any of aspects 21 through 22, wherein the first resource configuration is configured during two symbols of a slot, further comprising: selecting, based at least in part on the first resource configuration failing to satisfy the resource threshold, a set of additional symbols of the slot for the second resource configuration, the set of additional symbols being different symbols than the two symbols allocated to the first resource configuration.

Aspect 24: The method of aspect 23, further comprising: transmitting the feedback message over the set of additional symbols or multiplexed over the set of additional symbols and the two symbols.

Aspect 25: The method of any of aspects 21 through 24, wherein transmitting the indication comprises: transmitting a scaler that allocates a first set of symbols to the sidelink data channel and a second set of symbols to the sidelink feedback channel for the feedback message.

Aspect 26: The method of aspect 25, further comprising: transmitting the indication of the scaler in a SCI message.

Aspect 27: The method of aspect 26, wherein the SCI message comprises one or more bits configured to explicitly indicate the scaler, one or more parameters set to values to implicitly indicate the scaler, or both.

Aspect 28: The method of any of aspects 25 through 27, further comprising: transmitting the indication of the scaler in a layer three message via the sidelink data channel.

Aspect 29: The method of any of aspects 21 through 28, further comprising: receiving sidelink control signaling using the second resource configuration, the sidelink control signaling being different from the feedback message.

Aspect 30: The method of any of aspects 21 through 29, wherein the second resource configuration is for a slot of the sidelink data channel.

Aspect 31: The method of aspect 30, further comprising: receiving the feedback message during a last two symbols of the slot for the sidelink data channel using a HARQ-ACK format message associated with a PUCCH.

Aspect 32: The method of any of aspects 30 through 31, further comprising: receiving a multiplexed message during the slot of the sidelink data channel, the multiplexed message obtained by the second UE multiplexing the feedback message with sidelink data.

Aspect 33: The method of any of aspects 30 through 32, further comprising: receiving the feedback message, sidelink control signaling, or both, in a SCI two format message via the sidelink data channel.

Aspect 34: The method of any of aspects 30 through 33, further comprising: receiving the feedback message in a SCI three message via the sidelink data channel.

Aspect 35: The method of aspect 34, further comprising: transmitting, in the sidelink transmission via the sidelink data channel, a third resource configuration for the sidelink control three message.

Aspect 36: The method of any of aspects 34 through 35, wherein the SCI three message comprises a HARQ-ACK format message associated with a PUCCH.

Aspect 37: The method of any of aspects 21 through 36, wherein the second resource configuration is for a slot comprising the sidelink feedback channel.

Aspect 38: The method of aspect 37, further comprising: identifying, based at least in part on the first resource configuration, a last two symbols of the slot comprising the sidelink feedback channel; and selecting an additional set of symbols of the slot for the second resource configuration.

Aspect 39: The method of any of aspects 37 through 38, further comprising: identifying, based at least in part on the first resource configuration, a last three symbols of the slot comprising the sidelink feedback channel and a gap period occurring prior to the sidelink feedback channel; and transmitting, based at least in part on the second resource configuration, the sidelink transmission via the sidelink data channel during one or more symbols of the last three symbols of the slot.

Aspect 40: The method of any of aspects 37 through 39, further comprising: identifying, based at least in part on the first resource configuration, a last three symbols of the slot comprising the sidelink feedback channel and a gap period occurring prior to the sidelink feedback channel; and receiving, based at least in part on the second resource configuration, the feedback message via the sidelink feedback channel during one or more symbols of the last three symbols of the slot.

Aspect 41: An apparatus for wireless communication at a first UE, comprising a processor; memory coupled with the processor; and instructions stored in the memory and executable by the processor to cause the apparatus to perform a method of any of aspects 1 through 20.

Aspect 42: An apparatus for wireless communication at a first UE, comprising at least one means for performing a method of any of aspects 1 through 20.

Aspect 43: A non-transitory computer-readable medium storing code for wireless communication at a first UE, the code comprising instructions executable by a processor to perform a method of any of aspects 1 through 20.

Aspect 44: An apparatus for wireless communication at a first UE, comprising a processor; memory coupled with the processor; and instructions stored in the memory and executable by the processor to cause the apparatus to perform a method of any of aspects 21 through 40.

Aspect 45: An apparatus for wireless communication at a first UE, comprising at least one means for performing a method of any of aspects 21 through 40.

Aspect 46: A non-transitory computer-readable medium storing code for wireless communication at a first UE, the code comprising instructions executable by a processor to perform a method of any of aspects 21 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   determining that the first UE is to receive a sidelink transmission from a second UE, the sidelink transmission comprising a sidelink control channel and a sidelink data channel;
   receiving, based at least in part on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold;
   receiving the sidelink transmission from the second UE; and
   transmitting, to the second UE, the feedback message using the second resource configuration.

2. The method of claim 1, wherein the first resource configuration is configured during a first slot, further comprising:
   selecting, based at least in part on the first resource configuration failing to satisfy the resource threshold, a second slot to transmit the feedback message, the second slot being a different slot than the first slot.

3. The method of claim 1, wherein the first resource configuration is configured during two symbols of a slot, further comprising:
   selecting, based at least in part on the first resource configuration failing to satisfy the resource threshold, a set of additional symbols of the slot for the second resource configuration, the set of additional symbols being different symbols than the two symbols allocated to the first resource configuration.

4. The method of claim 3, further comprising:
   transmitting the feedback message over the set of additional symbols or multiplexed over the set of additional symbols and the two symbols.

5. The method of claim 1, wherein receiving the indication comprises:
   receiving a scaler that allocates a first set of symbols to the sidelink data channel and a second set of symbols to the sidelink feedback channel for the feedback message.

6. The method of claim 1, further comprising:
   transmitting sidelink control signaling using the second resource configuration, the sidelink control signaling being different from the feedback message.

7. The method of claim 1, wherein the second resource configuration is for a slot of the sidelink data channel.

8. The method of claim 7, further comprising:
   transmitting the feedback message during a last two symbols of the slot for the sidelink data channel using a hybrid automatic repeat/request acknowledgement (HARQ-ACK) format message associated with a physical uplink control channel.

9. The method of claim 7, further comprising:
   multiplexing the feedback message with sidelink data to obtain a multiplexed message; and
   transmitting the multiplexed message during the slot of the sidelink data channel.

10. The method of claim 7, further comprising:
    transmitting the feedback message, sidelink control signaling, or both, in a sidelink control information two format message via the sidelink data channel.

11. The method of claim 1, wherein the second resource configuration is for a slot comprising the sidelink feedback channel.

12. The method of claim 11, further comprising:
identifying, based at least in part on the first resource configuration, a last two symbols of the slot comprising the sidelink feedback channel; and
selecting an additional set of symbols of the slot for the second resource configuration.

13. The method of claim 11, further comprising:
identifying, based at least in part on the first resource configuration, a last three symbols of the slot comprising the sidelink feedback channel and a gap period occurring prior to the sidelink feedback channel; and
receiving, based at least in part on the second resource configuration, the sidelink transmission via the sidelink data channel during one or more symbols of the last three symbols of the slot.

14. The method of claim 11, further comprising:
identifying, based at least in part on the first resource configuration, a last three symbols of the slot comprising the sidelink feedback channel and a gap period occurring prior to the sidelink feedback channel; and
transmitting, based at least in part on the second resource configuration, the feedback message via the sidelink feedback channel during one or more symbols of the last three symbols of the slot.

15. A method for wireless communication at a first user equipment (UE), comprising:
determining that the first UE is to transmit a sidelink transmission to a second UE, the sidelink transmission comprising a sidelink control channel and a sidelink data channel;
transmitting, based at least in part on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold;
transmitting the sidelink transmission to the second UE; and
receiving, from the second UE, a feedback message using the second resource configuration.

16. The method of claim 15, wherein the first resource configuration is configured during a first slot, further comprising:
selecting, based at least in part on the first resource configuration failing to satisfy the resource threshold, a second slot to transmit the feedback message, the second slot being a different slot than the first slot.

17. The method of claim 15, wherein the first resource configuration is configured during two symbols of a slot, further comprising:
selecting, based at least in part on the first resource configuration failing to satisfy the resource threshold, a set of additional symbols of the slot for the second resource configuration, the set of additional symbols being different symbols than the two symbols allocated to the first resource configuration.

18. The method of claim 17, further comprising:
transmitting the feedback message over the set of additional symbols or multiplexed over the set of additional symbols and the two symbols.

19. The method of claim 15, wherein transmitting the indication comprises:
transmitting a scaler that allocates a first set of symbols to the sidelink data channel and a second set of symbols to the sidelink feedback channel for the feedback message.

20. The method of claim 15, further comprising:
receiving sidelink control signaling using the second resource configuration, the sidelink control signaling being different from the feedback message.

21. The method of claim 15, wherein the second resource configuration is for a slot of the sidelink data channel.

22. The method of claim 21, further comprising:
receiving the feedback message during a last two symbols of the slot for the sidelink data channel using a hybrid automatic repeat/request acknowledgement (HARQ-ACK) format message associated with a physical uplink control channel.

23. The method of claim 21, further comprising:
receiving a multiplexed message during the slot of the sidelink data channel, the multiplexed message obtained by the second UE multiplexing the feedback message with sidelink data.

24. The method of claim 21, further comprising:
receiving the feedback message, sidelink control signaling, or both, in a sidelink control information two format message via the sidelink data channel.

25. The method of claim 15, wherein the second resource configuration is for a slot comprising the sidelink feedback channel.

26. The method of claim 25, further comprising:
identifying, based at least in part on the first resource configuration, a last two symbols of the slot comprising the sidelink feedback channel; and
selecting an additional set of symbols of the slot for the second resource configuration.

27. The method of claim 25, further comprising:
identifying, based at least in part on the first resource configuration, a last three symbols of the slot comprising the sidelink feedback channel and a gap period occurring prior to the sidelink feedback channel; and
transmitting, based at least in part on the second resource configuration, the sidelink transmission via the sidelink data channel during one or more symbols of the last three symbols of the slot.

28. The method of claim 25, further comprising:
identifying, based at least in part on the first resource configuration, a last three symbols of the slot comprising the sidelink feedback channel and a gap period occurring prior to the sidelink feedback channel; and
receiving, based at least in part on the second resource configuration, the feedback message via the sidelink feedback channel during one or more symbols of the last three symbols of the slot.

29. An apparatus for wireless communication at a first user equipment (UE), comprising:
a processor;
memory coupled with the processor; and
instructions stored in the memory and executable by the processor to cause the apparatus to:
determine that the first UE is to receive a sidelink transmission from a second UE, the sidelink transmission comprising a sidelink control channel and a sidelink data channel;
receive, based at least in part on a first resource configuration for a sidelink feedback channel failing to satisfy a resource threshold associated with transmitting a feedback message, an indication of a second resource configuration from the second UE, the second resource configuration for transmitting the feedback message to the second UE for the sidelink transmission, the second resource configuration satisfying the resource threshold;

receive the sidelink transmission from the second UE; and transmit, to the second UE, the feedback message using the second resource configuration.

30. An apparatus for wireless communication at a first user equipment (UE), comprising:

a processor;

memory coupled with the processor; and instructions stored in the memory and executable by the processor to cause the apparatus to:

determine that the first UE is to transmit a sidelink transmission to a second UE, the sidelink transmission comprising a sidelink control channel and a sidelink data channel;

transmit, based at least in part on a first resource configuration for a sidelink feedback channel failing to satisfy a resource threshold associated with receiving a feedback message, an indication of a second resource configuration to the second UE for receiving the feedback message from the second UE for the sidelink transmission, the second resource configuration satisfying the resource threshold;

transmit the sidelink transmission to the second UE; and receive, from the second UE, a feedback message using the second resource configuration.

* * * * *